United States Patent [19]

Schneiter

[11] Patent Number: 5,082,362
[45] Date of Patent: Jan. 21, 1992

[54] ZOOM LENS FOR A VARIABLE DEPTH RANGE CAMERA

[75] Inventor: John L. Schneiter, Latham, N.Y.

[73] Assignee: General Electric Company, Schenectady, N.Y.

[21] Appl. No.: 547,253

[22] Filed: Jul. 2, 1990

[51] Int. Cl.⁵ .......................... G01C 3/00; G01C 5/00; G02B 15/00; G02B 27/00

[52] U.S. Cl. ...................................... 356/1; 354/403; 359/433; 359/694

[58] Field of Search .................. 356/1, 4; 354/403; 250/201.2, 201.4, 201.6; 350/423, 429, 527, 532, 560, 570, 571

[56] References Cited

U.S. PATENT DOCUMENTS

| | | | |
|---|---|---|---|
| 3,464,770 | 9/1969 | Schmidt | 356/4 |
| 3,723,003 | 3/1973 | Vockenhuber et al. | 356/4 |
| 4,167,329 | 9/1979 | Jelalian et al. | 356/5 |
| 4,269,512 | 5/1981 | Nosler | 356/375 |
| 4,373,805 | 2/1983 | Mallinson | 356/4 |
| 4,453,083 | 6/1984 | Bohlander et al. | 250/561 |
| 4,494,868 | 1/1985 | Lambeth | 356/1 |
| 4,627,734 | 12/1986 | Rioux | 356/1 X |
| 4,687,914 | 8/1987 | Tsunekawa et al. | 356/1 X |
| 4,701,049 | 10/1987 | Beckmann et al. | 356/1 |
| 4,713,533 | 12/1987 | Bremer et al. | 250/203 R |
| 4,714,959 | 12/1987 | Pshtissky | 358/184 |
| 4,716,284 | 12/1987 | Tanaka | 250/201 |
| 4,751,570 | 6/1988 | Robinson | 358/88 |
| 4,830,485 | 5/1989 | Penney et al. | 356/1 |
| 4,870,442 | 9/1989 | Tejima et al. | 354/403 |
| 4,916,324 | 4/1990 | Meier | 250/561 |
| 4,963,017 | 10/1990 | Schneiter et al. | 356/1 |
| 4,974,088 | 11/1990 | Sasaki | 358/210 |
| 4,989,466 | 2/1991 | Goodman | 354/70 X |

OTHER PUBLICATIONS

SPSE Handbook of Photographic Science and Engineering, ed. W. Thomas, Jr., 1973, John Wiley & Sons, pp. 181-185.
Bocchi et al., Sensor Performance in Long Range 3D Triangulation Systems (authors identified as being at CyberOptics Corporation, Minneapolis, Minn.).

*Primary Examiner*—Stephen C. Buczinski
*Attorney, Agent, or Firm*—Paul R. Webb, II; James C. Davis, Jr.

[57] ABSTRACT

An apparatus for a variable depth triangulation ranging system, the ranging system including means for emitting a light beam, means for focusing an emitted light beam on an object, and light sensitive means. The present apparatus includes motorized zoom/focus lens means for imaging reflected light onto said light sensitive means, a distance between the zoom lens means and the light sensitive means being substantially fixed when in an operative condition, the light sensitive means being rotatable relative to said zoom lens means, and means for adjustably positioning the light sensitive means and the zoom lens means such that an emitted light beam, a plane axis through the zoom lens means, and an image line through the light sensitive means all intersect at approximately a common point and satisfy the Scheimpflug condition.

15 Claims, 22 Drawing Sheets

SCHEIMPFLUG CONDITION

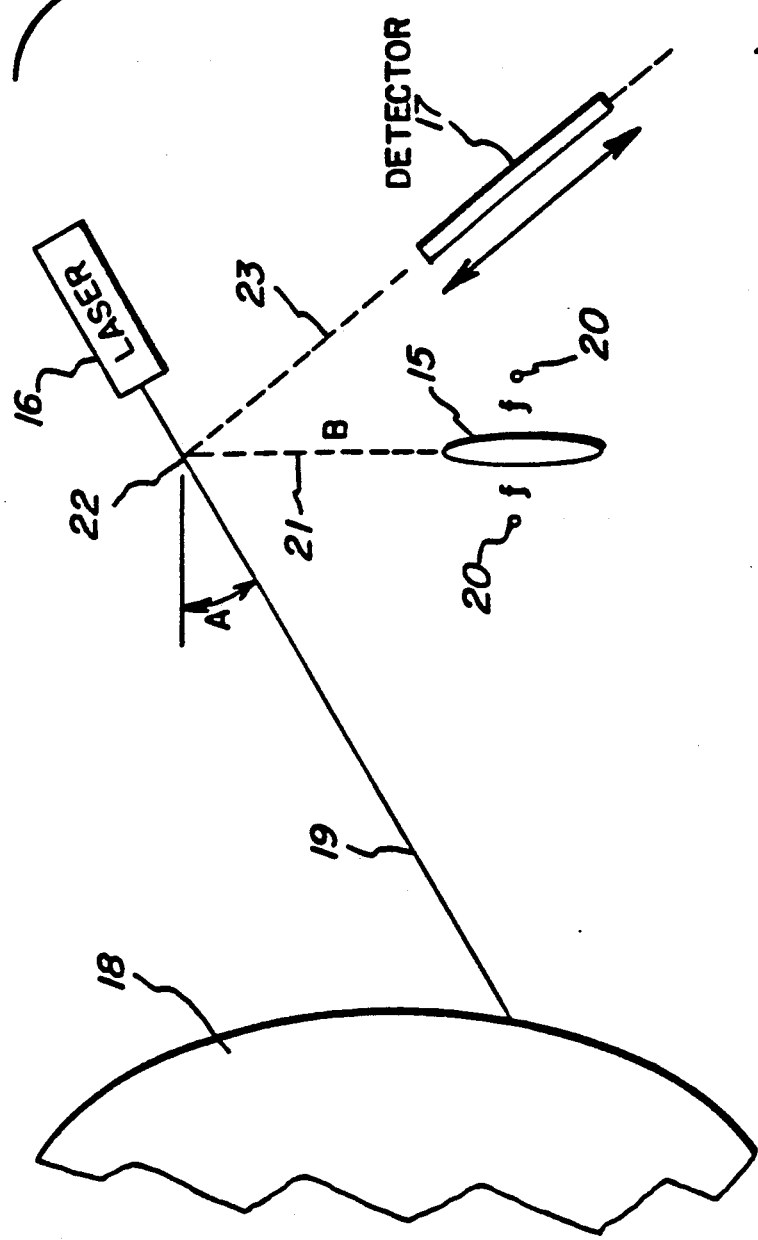

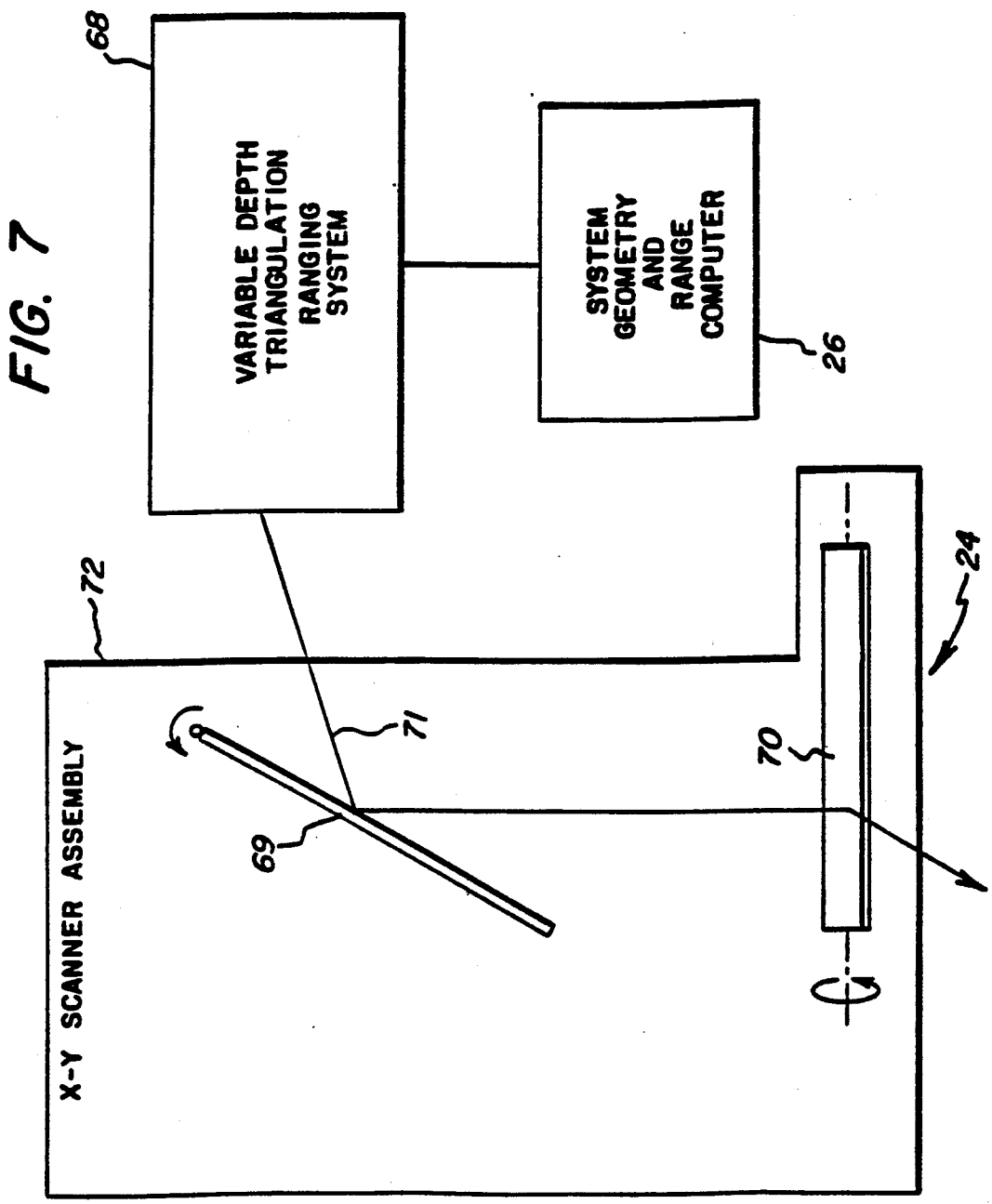

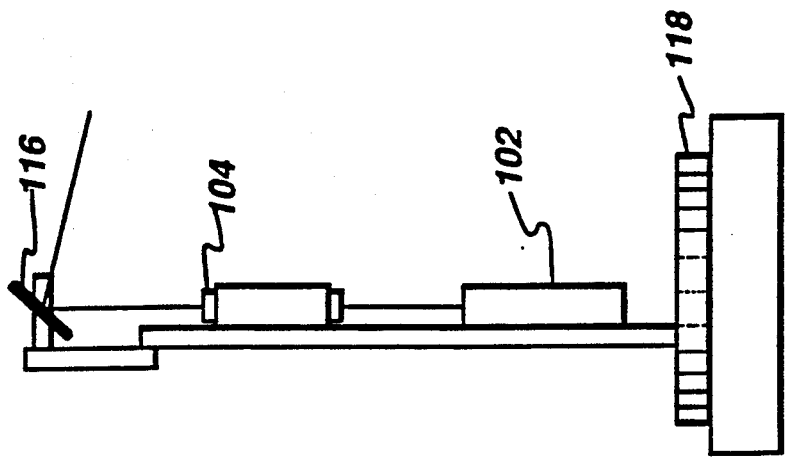
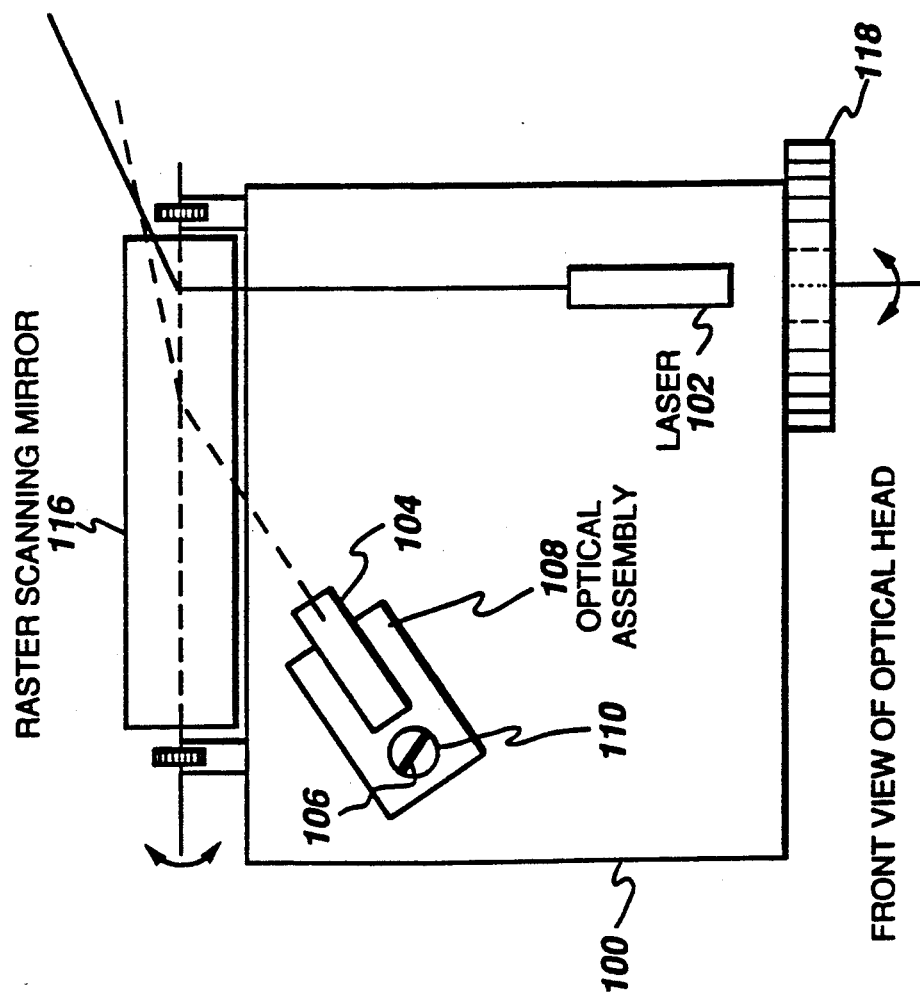

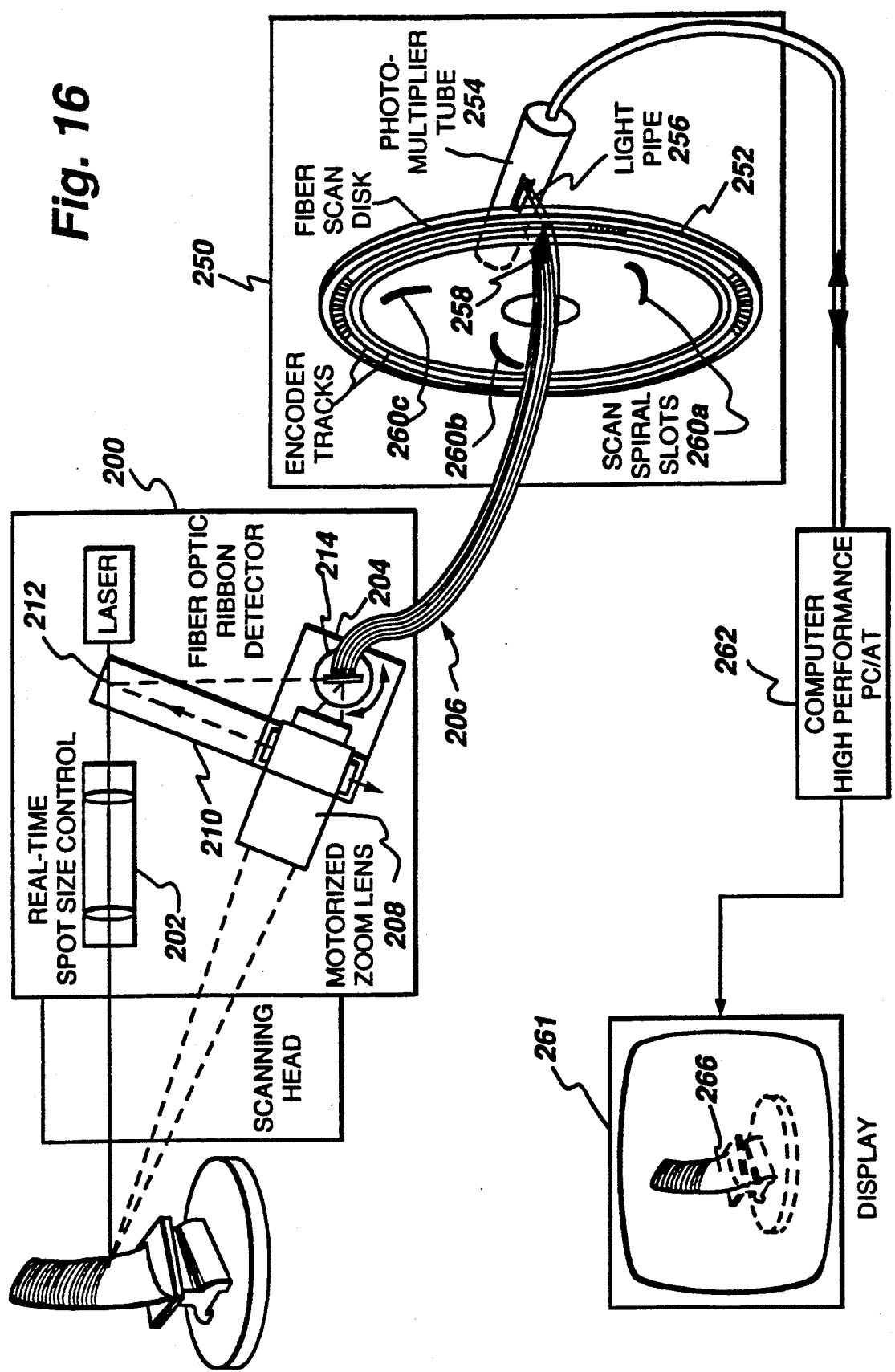

ZOOM LENS FOR A VARIABLE DEPTH RANGE CAMERA

The present invention relates to an optical triangulation ranging system, and more particularly, relates to a non-contact sensor and camera system, including a zoom lens, that has a variable geometry and is reconfigurable in real time to provide a desired performance.

RELATED APPLICATIONS

The present application relates to co-pending, allowed U.S. patent application Ser. No. 07/345,750, Variable Depth Range Camera, filed May 1, 1989, now U.S. Pat. No. 4,963,017, and assigned to the present assignee. The present application also relates to copending and commonly assigned U.S. patent application Ser. Nos. 07/547,260 and 07/547,268 now U.S. Pat. No. 5,032,023 entitled "An Optical Fiber Based Sensor For A Variable Depth Range Camera" and "A Focus Spot Size Controller For A Variable Depth Range Camera".

BACKGROUND OF THE INVENTION

Range from a reference point or plane to a given target point can be measured in a variety of ways. Passive techniques, such as stereo or range-from-focus, require illuminated target surfaces and typically require complexly patterned surfaces for reliable results. Active echoing techniques, such as RADAR, SONAR and LIDAR employ emitted electromagnetic, acoustic, and light energy, and monitor the reflected energy from the target surface. These techniques use a time-of-flight measurement as a basis for determining range and are typically expensive and complex.

In machine vision research and application, a different active technique called structured illumination has been employed. A ray of light is directed to the target surface along a direction which is not coaxial with the optic axis of the one or two dimensional sensing device. The intersection of the ray and target surface produces a spot of light which is imaged on the sensing plane of the imaging device. The 3-D position of this spot in space may be calculated from the known position and orientation of the imaging device from basic trigonometric relations. This structured illumination technique is called triangulation.

FIGS. 1a and 1b illustrate simple laser triangulation devices. With the geometry illustrated in FIGS. 1a and 1b, including a laser 10, a lens 11, a detector 12 and an object 13, a reflected spot is imaged higher on the detector 12 as the target surface moves farther from the imaging lens. In most devices using this geometry, however, the reflected spot is in focus for only one target distance and is blurred in varying degrees for all other distances in the depth of field as shown in FIGS. 2a and 2b. Blurring reduces the sensitivity of the device and effectively reduces the depth of field, i.e., the range over which a system can provide satisfactory definition.

Three of the basic performance measures of a ranging system are standoff distance, depth of field, and range resolution. The standoff distance is the nominal range of the device and is typically arbitrarily chosen as the near point, mid point or far point in the depth of field. The resolution is the smallest change in range values the system can discriminate and typically varies over the depth of field. Triangulation devices are engineered for a certain standoff distance, depth of field, and range resolution. That is, the geometry of a device is chosen based on the application, and desired changes in performance require changing imaging optics. In certain applications, such as imaging in remote areas, such inflexibility is unacceptable.

A first problem to be solved, therefore, is to provide blur-free imaging on a detector so that all reflected target returns are in focus. A second problem to be overcome is to construct a sensor that is reconfigurable in the sense that standoff distance, depth of field, and/or range resolution can be varied under electronic control without requiring the replacement of components.

It is well known in the photographic industry that tilting the camera at the moment of exposure leads to an effect called keystoning, in which parallel lines in the subject appear as converging lines in the result. This can be rectified during printing by tilting the enlarger easel by the same angle by which the camera was tilted. To achieve sharp imagery throughout the result, the enlarger lens must also be tilted slightly so that the planes of the lens, easel, and negative all meet at a common location, in accordance with what is known as the Scheimpflug condition in optics. The Scheimpflug condition can also be interpreted in an alternative way: a line on the object side of the lens is imaged to a line on the image side of the lens, and the two lines intersect with the line representing the plane of the lens, as shown in FIG. 3a. If the ray of light for the system is directed along some line on the object side of the lens, then the detector should be disposed along the Scheimpflug condition-predicted line on the image side to facilitate blur-free imaging of reflected target returns as shown in FIG. 3b.

The three system parameters—standoff distance, depth of field, and range resolution—can be calculated if the geometry of the triangulation ranging system is known as well as information about the imaging lens and detector. Conversely, any two of these three performance measures may be selected and the system geometry can be determined given a specific imaging lens and detector. Providing the mechanical degrees of freedom in such a sensor results in a reconfigurable system capable of a wide range of performance measures without requiring the replacement of the physical components.

A variable depth triangulation ranging system is described in allowed and copending U.S. patent application Ser. No. 07/345,750, Variable Depth Range Camera, which is assigned to the present assignee. The ranging system includes a light beam emitting component to generate and direct a light ray towards an object, a photodetector component capable of measuring distance along a single axis, i.e. a linear photodetector, and an imaging lens component for imaging light reflected off the object onto the detector. An image line is defined that extends longitudinally through the photodetector, and a plane axis that passes through the lens component. One of the three system components is at a fixed location, and means are provided for adjustably positioning the other two components such that the light beam, plane axis and image line all intersect approximately at a common point and satisfy the Scheimpflug condition. The two movable components are reconfigurable whereby the values of any two performance parameters selected from the group consisting of standoff distance, depth of field, and range resolution at a point within the depth of field may be chosen and the system geometry changed to achieve those values. The system includes means to calculate system geometry and range from received detector signals. A scanner may be provided to scan the light beam along a line or over an area. The light source may be a laser and the photodetector may be a lateral effect photodiode, linear array sensor or position sensitive photomultiplier.

In the above-described system, it has been found that it is preferred that the light beam be focused into a small spot on the target. This facilitates improving the resolution and accuracy with which the receiving optics can collect reflected light from the target and focus it onto a detector. Maintaining a small spot on the target as the target is scanned requires real-time, dynamic control of laser spot size.

Also, in order to facilitate high resolution, it is preferred that the detector be long with a large number of effective elements. The resolution and accuracy of the detector improves performance of the overall system.

Moreover, as discussed above, the position of the lens relative to the detector may have to be adjusted to obtain a satisfactory resolution. For some lens focal lengths, however, a required lens-to-detector distance is not suitable. For example, the lens-to-detector distance may be more than ten feet for some applications.

It is therefore an object of the present invention to provide a ranging system including a lens apparatus having variable zoom and focus thereby providing a suitable and fixed lens-to-detector distance.

SUMMARY OF THE INVENTION

The present invention is an apparatus for a variable depth triangulation system, the ranging system including means for emitting a light beam, means for focusing an emitted light beam on an object, and light sensitive means. The present apparatus comprises zoom lens means for imaging reflected light onto the light sensitive means. The distance between the zoom lens means and the light sensitive means is substantially fixed, and the light sensitive means is rotatable relative to the zoom lens means. The present apparatus also includes means for adjustably positioning the light sensitive means and the zoom lens means such that an emitted light beam, a plane axis through the zoom lens means, and an image line through the light sensitive means all intersect at approximately a common point to satisfy the Scheimpflug condition.

BRIEF DESCRIPTION OF THE DRAWINGS

These and other objects of the present invention, together with further features and advantages thereof, will become apparent from the following detailed specification when read together with the accompanying drawings, in which:

FIG. 4 shows a triangulation ranging system that satisfies the Scheimpflug condition and the known system parameters from which standoff distance, depth of field, and range resolution are calculated and vice versa;

FIG. 7 illustrates an X-Y scanner assembly usable with ranging systems;

FIGS. 13a-13b illustrate scanning using the camera shown in FIG. 12;

FIG. 16 illustrates a variable depth range camera including real-time spot size control, an optical fiber ribbon detector, and an encoded disk for scanning the optical fibers;

DETAILED DESCRIPTION OF THE INVENTION

Figure 1A:
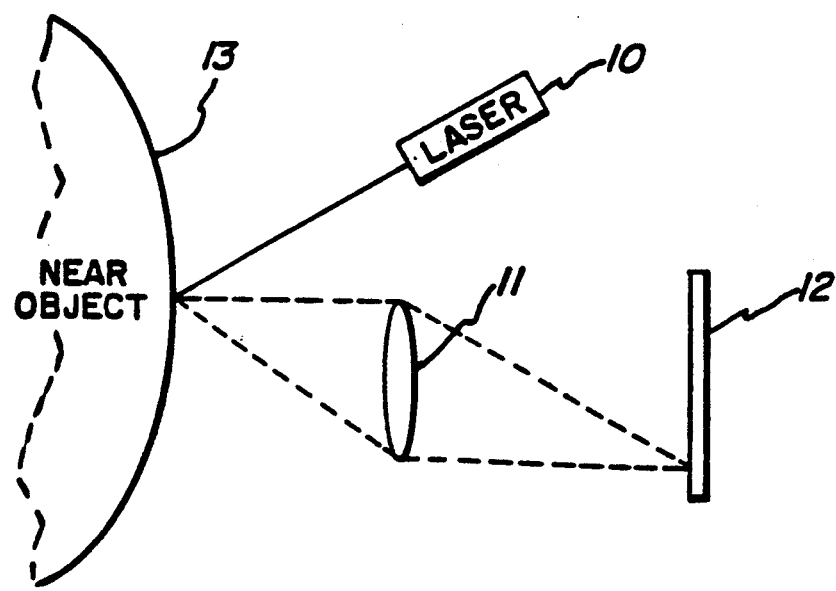
FIGS. 1a and 1b illustrate a single point triangulation system measuring range to near and far objects.
Figure 1B:
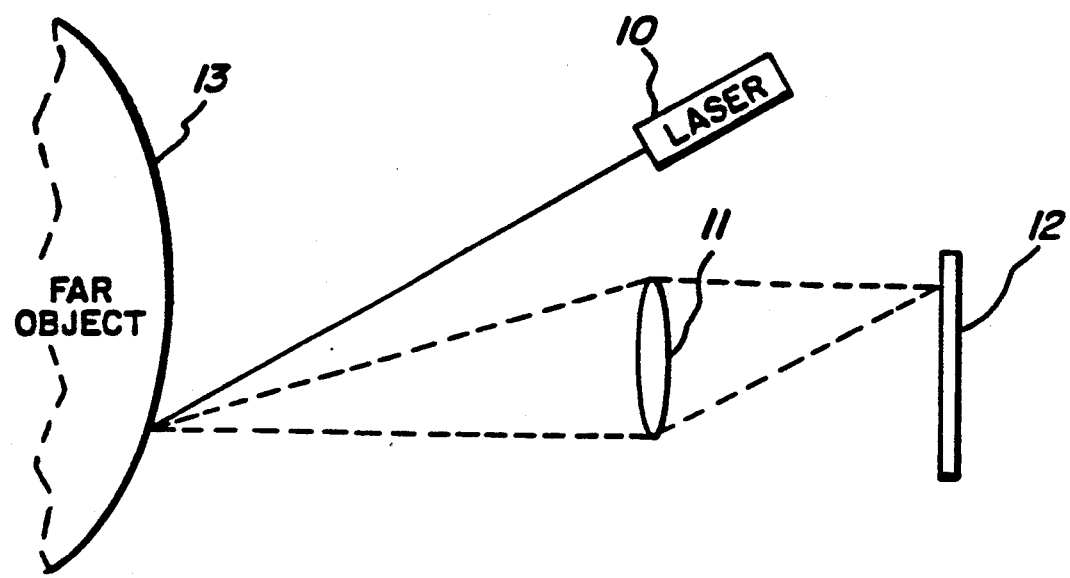
Figure 2A:
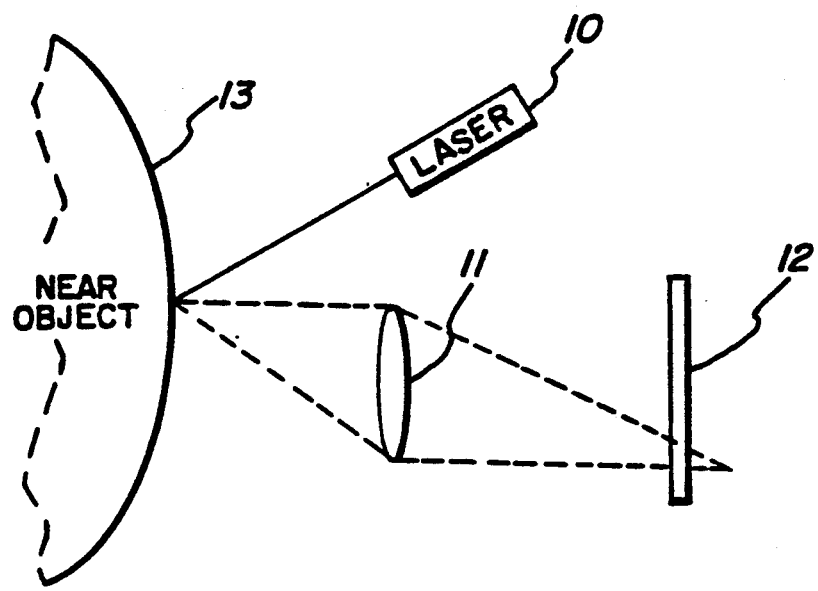
FIGS. 2a and 2b illustrate behavior of a standard triangulation ranger.
Figure 2B:
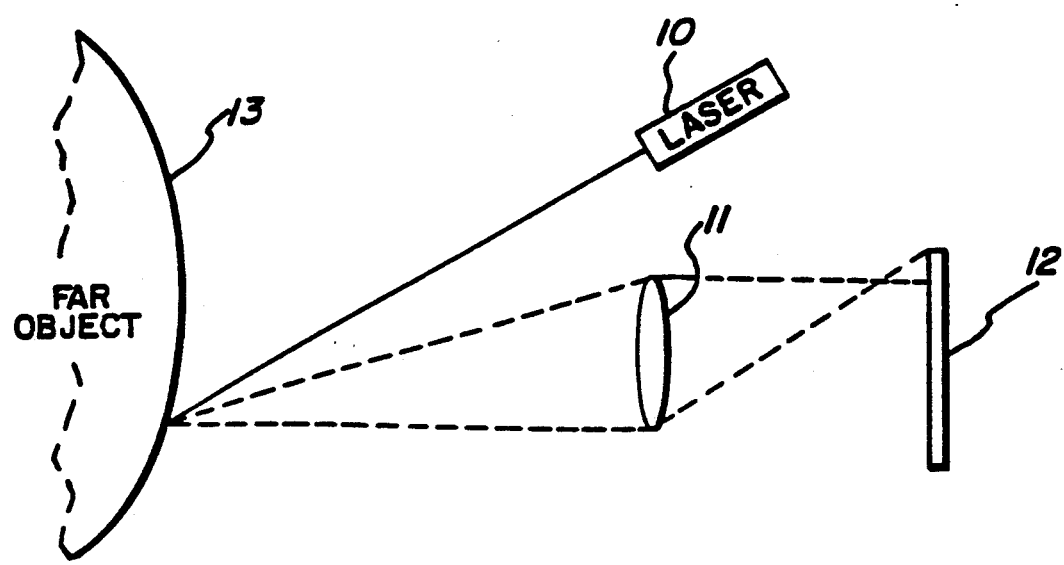
Figure 3A:
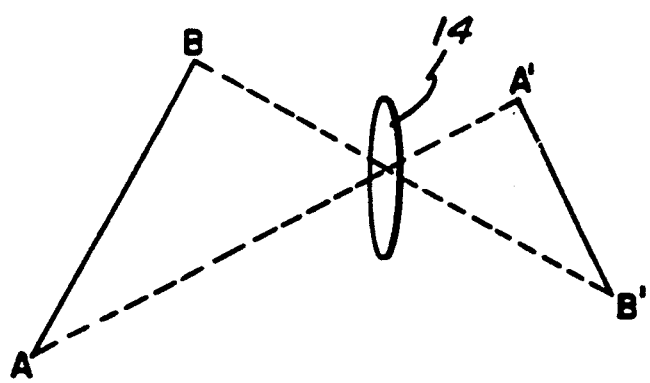
FIGS. 3a and 3b show that a line in object space is imaged to a line in image space, and that the relationship of the lines is given by the Scheimpflug condition.
Figure 3B:
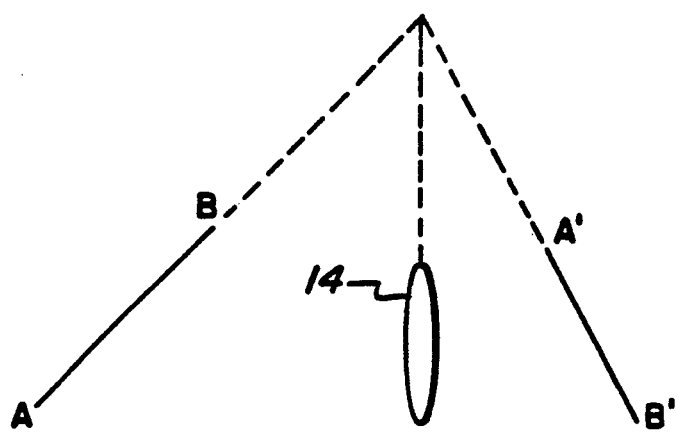

A point ranger capable of making a single range measurement is shown in FIG. 4. In this triangulation ranging system, an imaging lens 15 is at a fixed location relative to a laser 16 and a linear detector 17, which are movable and positioned so as to satisfy the Scheimpflug condition and assure that all spots of light reflected from the object 18 are in focus on the detector. The laser beam 19 is at an angle A to the horizontal, the triangulation angle in this configuration. Imaging lens 15 has a focal length f and focal points 20, and the triangulation base B of the system is measured from the center of the lens along a plane axis 21 extending through the lens to the point 22 where the laser beam and plane axis intersect. An image line 23 which extends longitudinally through the photodetector 17 intersects the plane axis 21 and laser beam 19 at common point 22, according to the Scheimpflug condition. The standoff distance, depth of field, and range resolution at a point within the depth of field are calculatable functions of the triangulation angle, triangulation base, lens focal length, detector length and effective granularity, and detector position along the image line as shown in FIG. 4.

One can select any two of the three system performance measures or parameters and determine what the system geometry must be, given a specific lens and photodetector. This applies to other embodiments of the ranging system including an embodiment in which the light beam emitting component is fixed and the imaging lens and photodetector components are movable, and another embodiment in which the photodetector is at a fixed location and the imaging lens and light beam emitting components are movable.

Depth of field, as used herein, refers to a range of distances over which a system can provide satisfactory definition. Standoff distance, as used herein, refers to a distance from a reference on the camera, such as the center of the lens in FIG. 4, to a closest object surface that can be measured. Range resolution, as used herein, refers to the resolution at some given point within the depth of field. For the single point ranger shown in FIG. 4, the position of the lower end of detector 17 dictates what the standoff distance is, the position of the upper end of detector 17 dictates the maximum range value, and the distance between the minimum and maximum range values is the depth of field. The range resolution then takes monotonically varying values within the depth of field based on the number of pixel elements in the detector and its length. Range resolution is not constant over the entire depth of field, but is finer for the near field than for the far field. As the detector becomes more vertical, the resolution is increasingly finer and the depth of field is smaller. The relationship and interaction between these three performance parameters will be understood by those skilled in the art.

Figure 5:
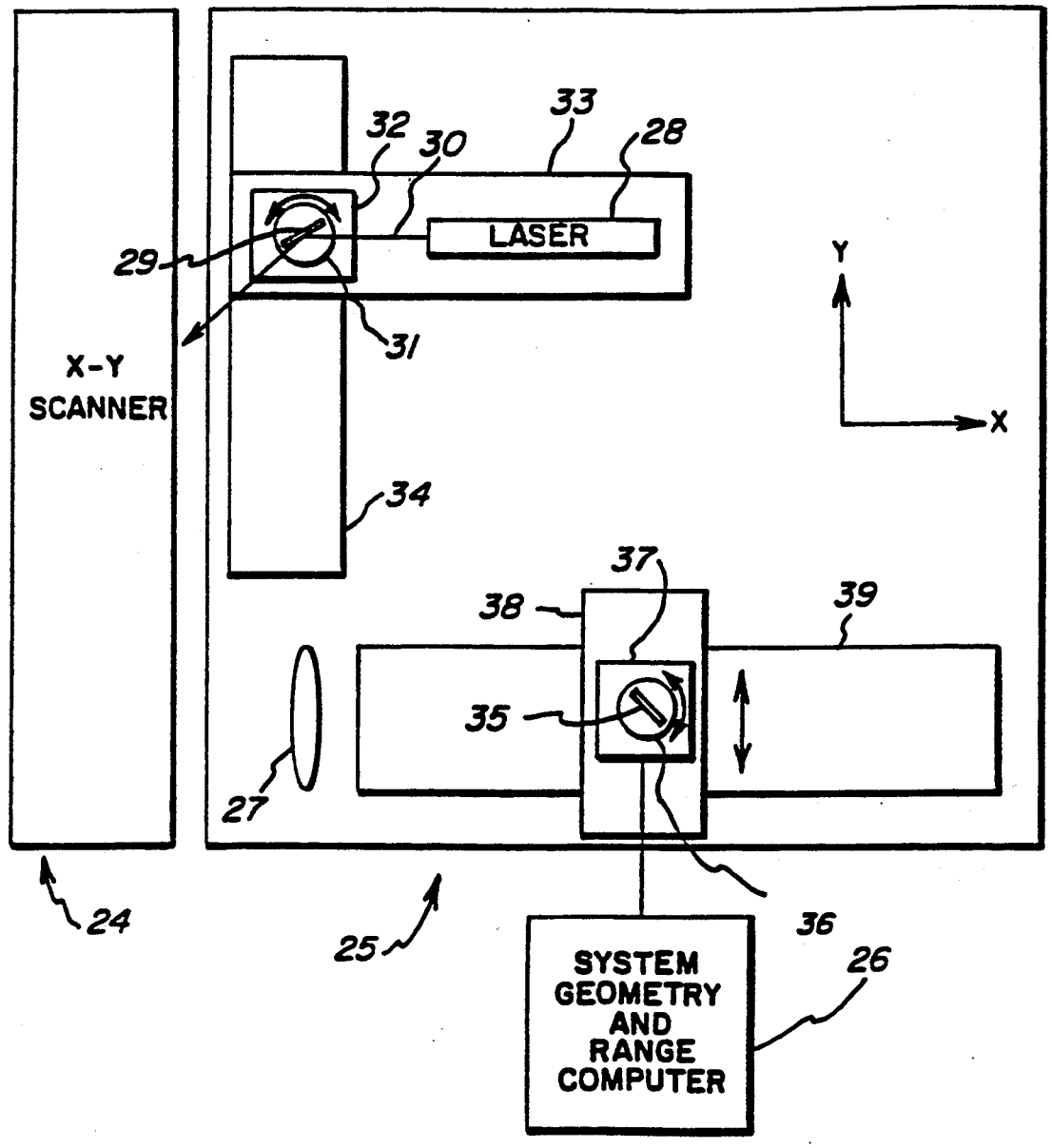
FIG. 5 is a schematic plan view and block diagram of an embodiment of the variable depth range camera described in U.S. patent application Ser. No. 07/345,750.

The variable depth range camera in FIG. 5 is reconfigurable in real time and is a system that allows for continuously variable standoff distance, depth of field and range resolution without requiring the replacement of physical parts. A scanner 24 is typically placed in front of the variable depth triangulation ranging system 25 to direct the light ray and viewing axis in any random direction for random target range acquisition or, when the light ray is scanned over an area, full fields of data may be obtained. A system geometry and range computer 26 does the necessary computations including the calculation of range from received photodetector signals. Algorithms are provided for determining system geometry given the performance requirements, lens focal length and detector resolution.

An imaging lens 27 is mounted at a fixed location on the base of the device. The imaging lens component may be, instead of a single lens, a lens system having an effective plane axis. The light beam emitting assembly is comprised of a laser 28 and a variable orientation mirror 29 for changing the triangulation angle of the laser beam 30. Mirror 29 is vertical as seen from this top view and is on a rotary stage 31. Laser 28 and a base 32 for the rotary stage are mounted on a structural member 33 which is in turn supported on a motorized linear slide 34. Movement of the light beam emitting assembly in the Y direction adjusts the triangulation base of the system. An X,Y stage arrangement is provided for adjustably positioning the photodetector 35, which may be a lateral effect photodiode, a linear array, line scan sensor, or a position sensitive photomultiplier and the associated electronics. The detector is on a rotary stage 36 that is supported on a base plate 37. A structural member 38 carries this assembly and has linear movement in the Y direction, and is mounted on a motorized linear slide 39 for X direction movement. Details of the linear and rotary actuators in such a system are not illustrated but are well known to those skilled in the art.

Figure 6A:
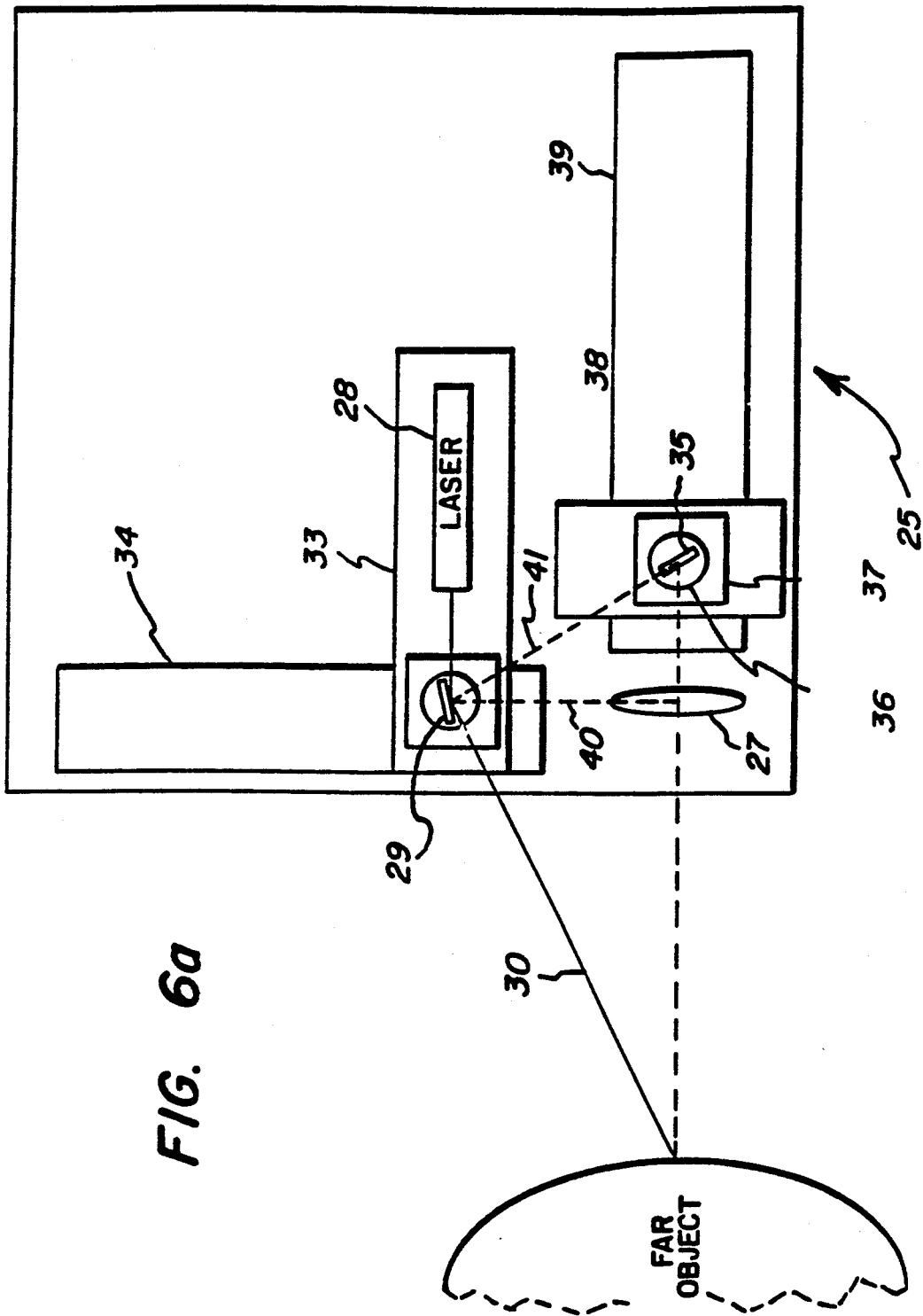
FIGS. 6a and 6b show reconfiguration of the system shown in FIG. 5 to measure range to far and near objects.
Figure 6B:
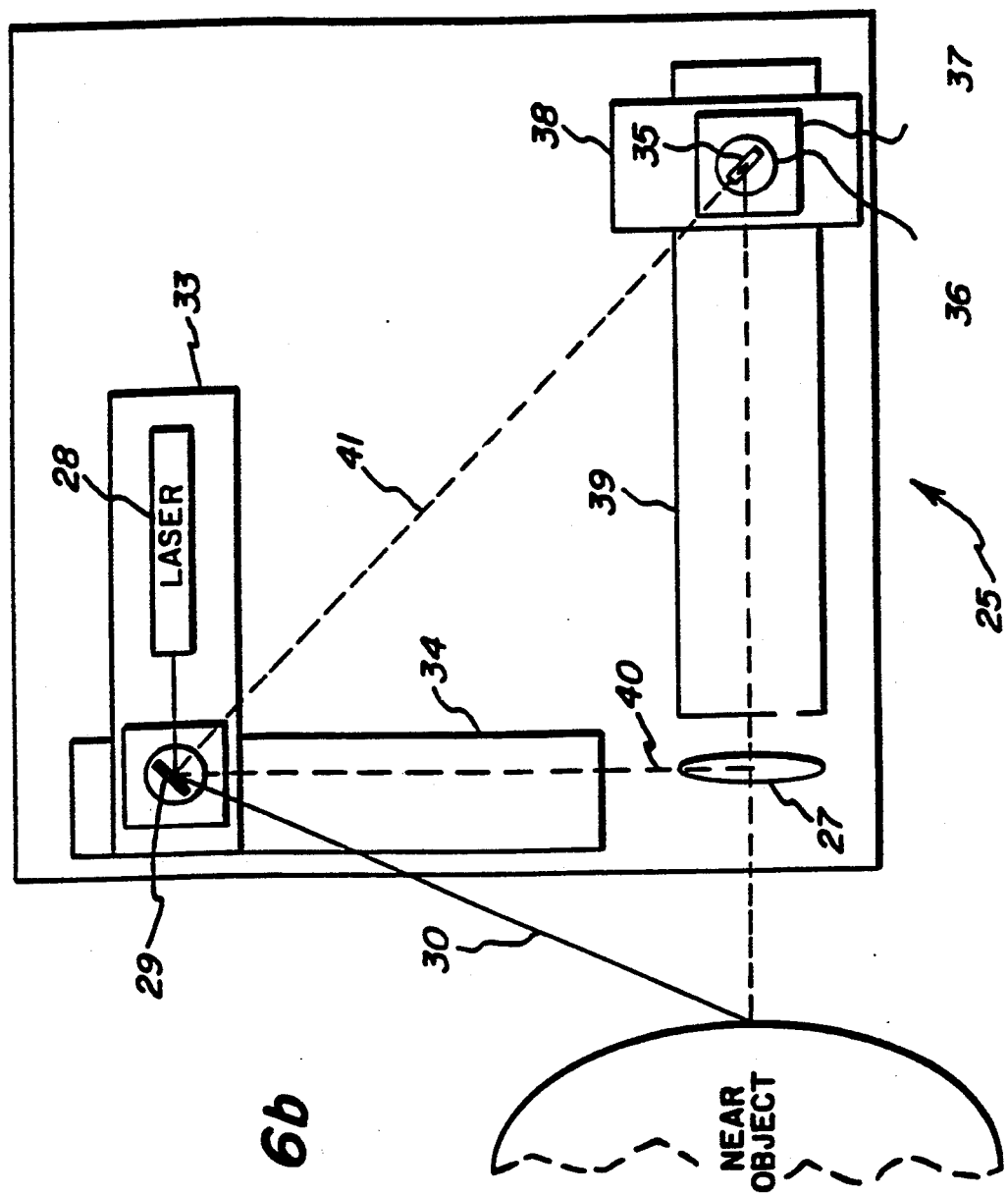

FIGS. 6a and 6b show the variable depth triangulation ranging system 25 in the single-point ranger configuration and how the system geometrically reconfigures itself to provide the requested performance. These figures illustrate that range data can be obtained from an infinite or large depth of field at low resolution, and then very fine resolution data can be obtained at regions of interest simply by varying the geometry of the device. In both configurations, the laser beam 30, imaging lens component plane axis 40, and an image line 41 extending longitudinally through the photodetector 35, all intersect at a common point. The system configured as in FIG. 6a acquires range data from a far object with low resolution and a large depth of field. The system triangulation base is small as is the triangulation angle. When reconfigured as illustrated in FIG. 6b to have a large triangulation base and large triangulation angle, the standoff distance is small and range data is acquired from a near object with high range resolution and small depth of field.

FIG. 7 is a diagram of the variable depth range camera showing in greater detail the scanning means 24. Scanner 24 has a set of mirrors to bend the optical plane up and down, and back and forth. The illustrated scanning assembly has two mirrors 69 and 70 to respectively sweep laser beam 71 in orthogonal directions. Mirror 69 is nearly vertical as seen in this top view and is pivoted about an axis that is perpendicular to base 72. Pivoting this mirror sweeps the laser beam along one direction to scan along a line on the object. Second mirror 70 is nearly horizontal as seen from the top and pivots about a longitudinal axis to sweep the laser beam in the orthogonal direction. Both mirrors are employed to scan over an area, say by scanning along a line, then in the perpendicular direction for a short distance, and along a line parallel to the first line, and so on.

An actual system operation is typically as follows:

1. The user or a computer determines performance objectives and desired values of two of the following three: standoff distance, depth of field, and range resolution at a point within the depth of field.

2. The computer performs calculations to determine if the objectives can be met.

3. If these objectives can be met or exceeded, computer 26 calculates the required optimal system geometry, given prior information about lens focal length, detector sensitive length, and effective detector resolution.

4. Linear and rotary actuators in the variable depth triangulation ranging system 68 are positioned to effect the system geometry.

5. Range data are obtained by energizing the laser, operating the scanner assembly 24, and reading the detector. Received photodetector signals are fed to appropriate amplification equipment, conditioned, digitized, and stored.

6. Range values are calculated in computer 26 from the stored data, known system geometry, and appropriate calibration tables.

The variable depth range camera can be used in a variety of environments for many purposes. The working volume, i.e., the volume to be scanned, may be defined and tailored to many applications. One metrology application is a precision, non-contact measurement device for inspection of precision airplane engine parts. There are a variety of automated rendezvous and docking applications. This device is useful whenever non-contact range information is required, especially if the information necessitates dynamic system reconfiguration to focus on regions of interest.

Figure 8:
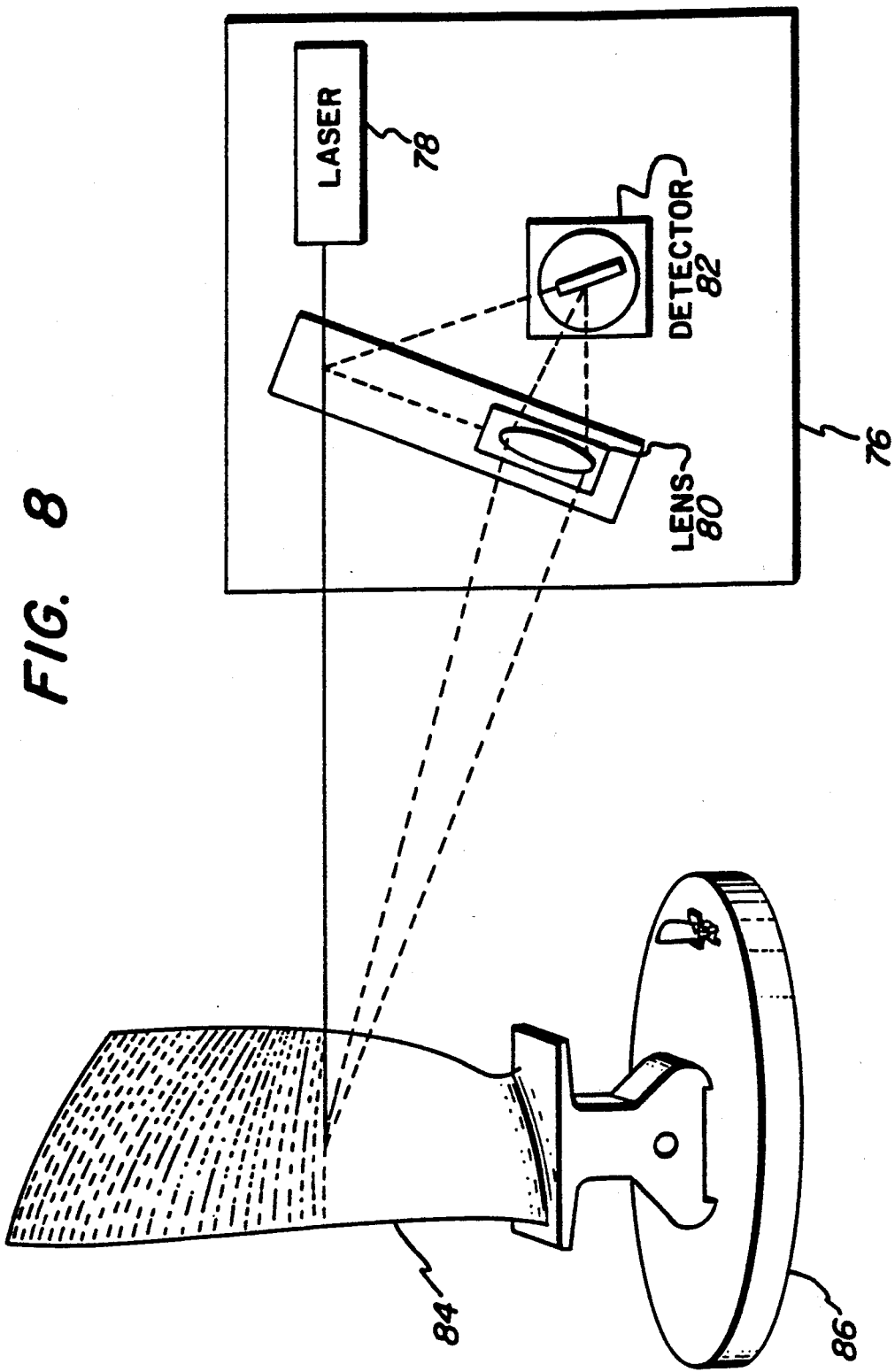
FIG. 8 illustrates scanning, using the variable depth range camera, an object.

The configuration of the variable depth range camera as discussed up to this point is suitable for operations where the lens-to-detector distance for satisfying the Scheimpflug condition is short. For example, and referring to FIG. 8, a ranging system 76 is configured in accordance with the Scheimpflug condition and includes a laser 78, a lens 80, and a detector 82. The camera is shown configured for generating an image of an object 84 on a pedestal 86. As shown, the beam emitted from laser 78 is directed to object 84 and a corresponding image from a focused spot on the object is reflected to lens 80 onto detector 82.

Figure 9:
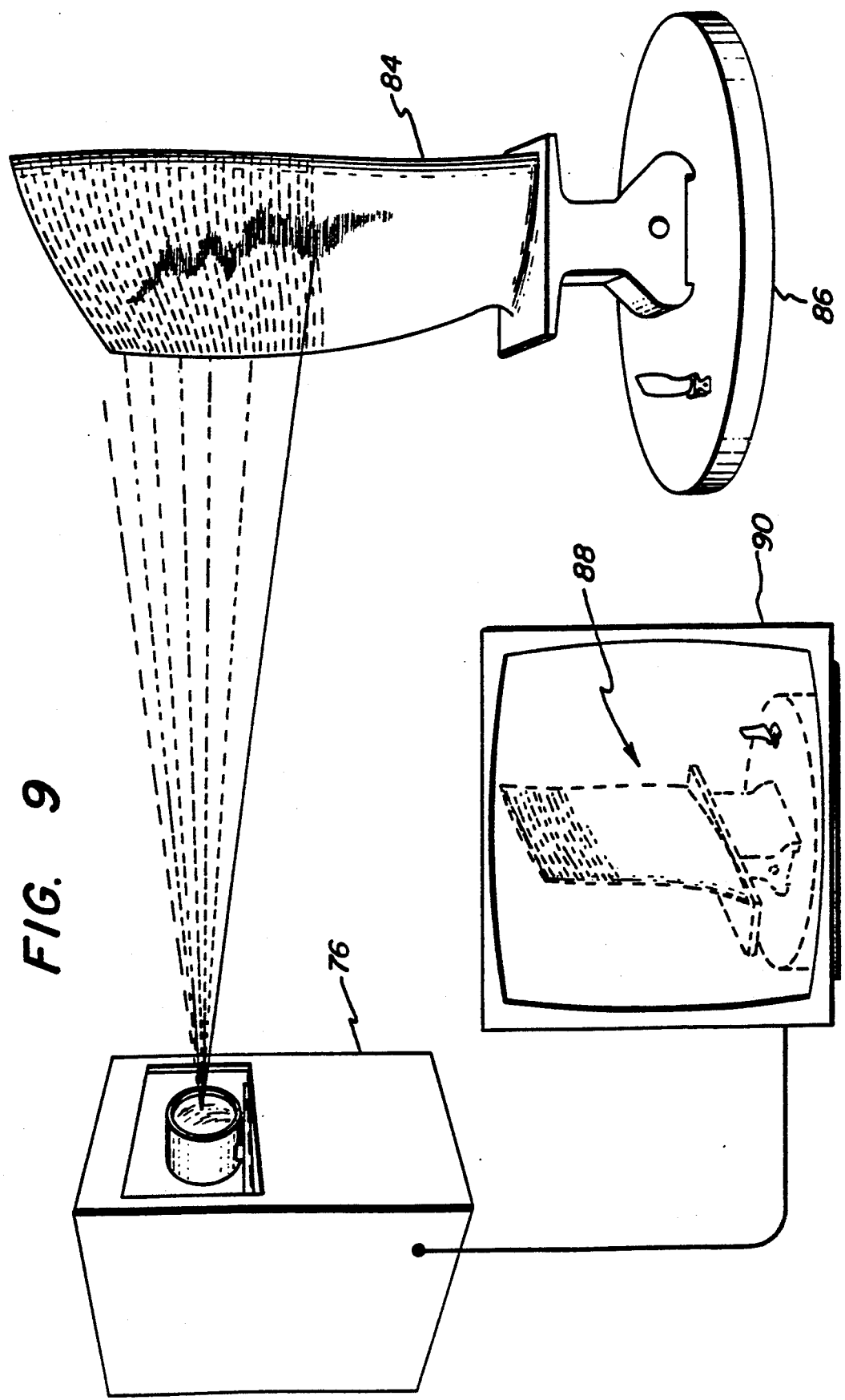
FIG. 9 illustrates scanning, using the variable depth range camera, an object and generating an image from data obtained during the scan operation.
Figure 10:
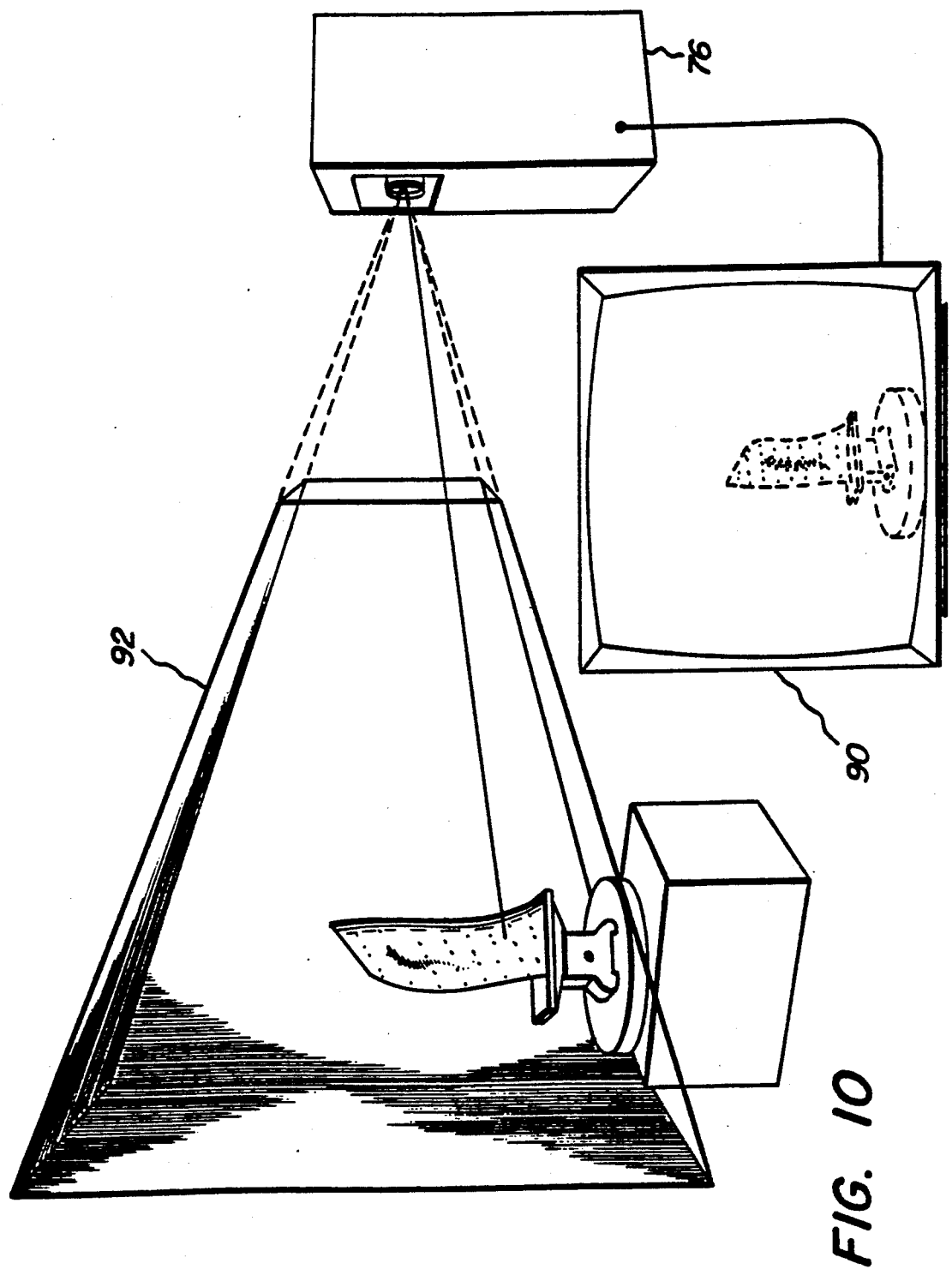
FIG. 10 illustrates a first depth of field and field angle for the variable depth range camera.

Generating an image of object 84 is shown in FIG. 9 wherein an image 88 is shown on a display 90. FIG. 10 illustrates the camera system configured to have a large depth of field. More specifically, when camera 76 is configured to have a large depth of field and large field angles, an image such as the image shown on display 90 could be generated. The working volume is illustrated as being bound by a region 92.

Figure 11:
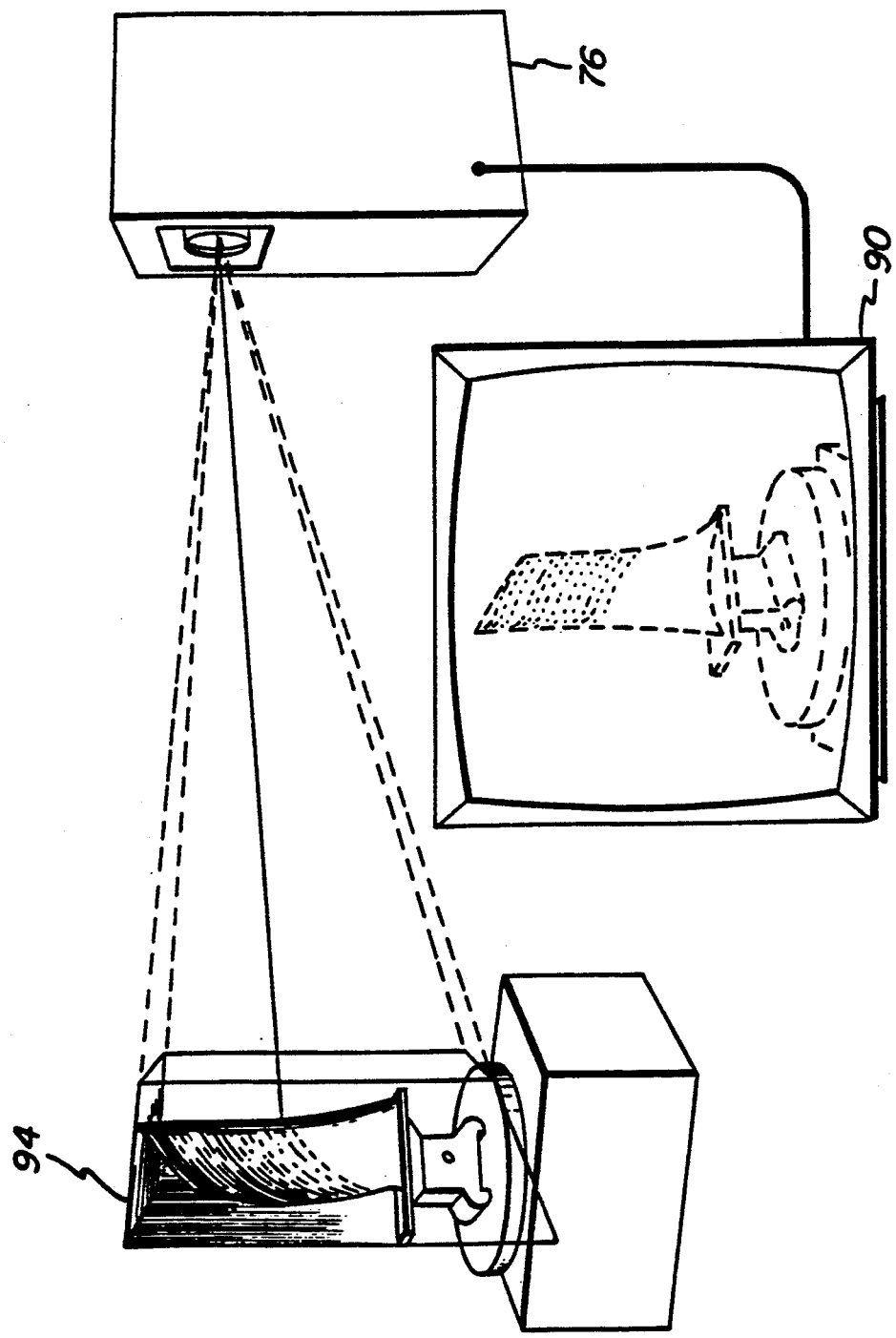
FIG. 11 illustrates a second depth of field and field angle for the variable depth range camera.

FIG. 11 illustrates an image which would be generated on display unit 90 when camera 76 is configured to have a small working volume.

In order to facilitate high resolution of a generated image for varying depths of field such as the depths of field illustrated in FIGS. 10 and 11, the lens to detector distance typically is varied as illustrated by comparing the lens to detector distances shown in FIGS. 6a and 6b. For some lens focal lengths, however, the required lens to detector distance is not possible to obtain and still maintain the ranging camera in a practical size package. For example, the lens to detector distance may be more than 10 feet for some applications.

Figure 12:
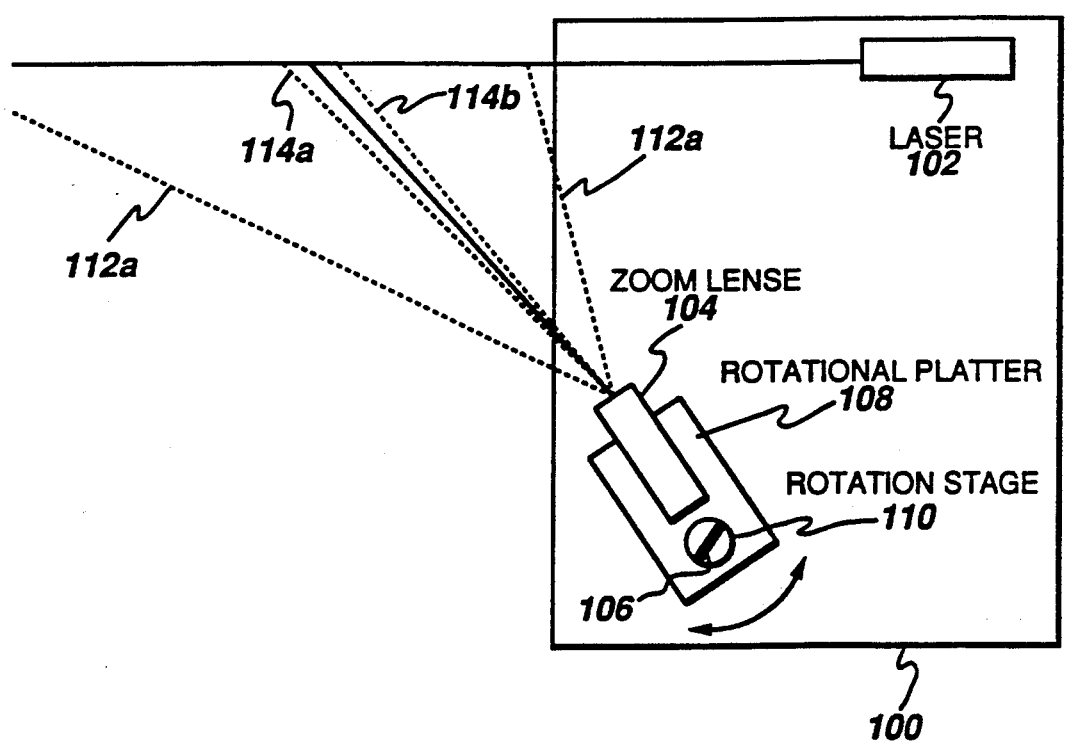
FIG. 12 illustrates utilizing a zoom lens as part of a variable depth range camera.

In order to solve the problem of unsuitable lens to detector distance, the embodiment illustrated in FIG. 12 may be utilized. More specifically, in the embodiment shown in FIG. 12, a variable depth range camera 100 includes a laser 102, a zoom lens 104 and a detector 106. Both the zoom lens and the detector are mounted on a rotational platter 108. Detector 106 is mounted on a rotation stage 110 so that the relative orientation of the detector to the zoom lens may also be adjusted. Zoom lens 104 may be a commercially available lens, such as a Fujinon C14X25MO3 motorized zoom, focus and iris lens. This lens, of course, can be modified, for example, by removing mechanical stops to increase the focusing range, zoom range, etc.

Utilizing zoom lens 104 provides that the depth of field of system 100 may be adjusted, and the Scheimpflug condition satisfied, simply by adjusting zoom lens 104, rotational platter 108, and rotation stage 110. This configuration therefore eliminates a need to adjust the lens to detector distance for applications within the operating domain of zoom lens 104. As illustrated in FIG. 12, the depth of field of camera 100 may be, for example, as broad as the depth of field bounded by lines 112a and 112b or may be as small as the depth of field bounded by lines 114a and 114b. Importantly, in the configuration illustrated in FIG. 12, the Scheimpflug conditions may still be satisfied to facilitate generating focused images of the reflected spot from the target throughout the working volume.

More particularly, with zoom lens 104, the Scheimpflug condition is determined experimentally. The zoom, i.e., system depth of field, and orientation of zoom lens 104 are first set. Then, an object is placed at the intersection of the zoom lens optic axis and the laser beam axis. The focus of the zoom lens is then set so that the tightest, i.e., sharpest, image of the reflected spot is formed on the detector. Since the object is at the intersection of the optic axis and beam axis, the image should be formed at the center of the detector. The detector is then rotated so than off-axis images also are in focus on the detector. Once the detector is set so that all spot images are in focus throughout the depth of field, this condition necessarily means that the Scheimpflug conditions are satisfied. There are competing constraints in each application, and a system user must make an "optimizing" choice that satisfies all constraints reasonably well. The constraints include zoom lens field angles and triangulation base configurations.

The zoom lens used is a 14 to 1 zoom lens capable of focusing as close as 2 feet away. This is a f/3.5 lens with variable focal length of nominally 25-350 mm, focusing range, after removing factory mechanical stops, of 2 feet-50 feet and zoom field angle of from 2°37' to 35°29'. The effective field cone vertex lies within the lens assembly and could be placed approximately 2 feet away from the laser axis, i.e., a "triangulation base" of approximately 2 feet. With full field angle of 35.5°, the DOF with shortest SO (2 feet) should be 9.9 feet. That is, if the lens is used at full field angle, and the nearest range reading is at 2 feet, the farthest reading will be at 11.9 feet. If the resolution were evenly distributed, it would be from 24 to 48 mils, depending upon whether 4096 or 2048 samples, respectively, can be provided per range reading. The actual resolution will be better near 2 feet and worse at 12 feet. If the field is at its narrowest, and the lens is oriented for 2 foot SO, the DOF should be 2.3 inches. In this case, the resolution will be fairly constant throughout the DOF and would be from 0.6 to 1.1 mils. If the lens is oriented instead for largest SO, with largest range reading of 10 feet, the DOF would be 23 inches, i.e., readings would be from 8 feet 1 inch to 10 feet. The resolution is in the 6 to 11 mil range.

Referring now to FIGS. 13a and 13b, camera 100 is illustrated as including a scanning mirror 116 and a horizontal scan axis control 118. FIG. 13b is a side view of the embodiment illustrated in FIG. 13a. As shown in FIGS. 13a and 13b, scanning mirror 116 is rotatably mounted to be rotated at least 45° relative to laser 102. Horizontal scan control 118 provides that the entire system including the scanning mirror can be rotated 360°. In an actual implementation, the mirror is limited to ±45° rotation, i.e., 90° full. By providing this rotation, system 100 may be utilized to image an object disposed at most any position.

Figure 14:
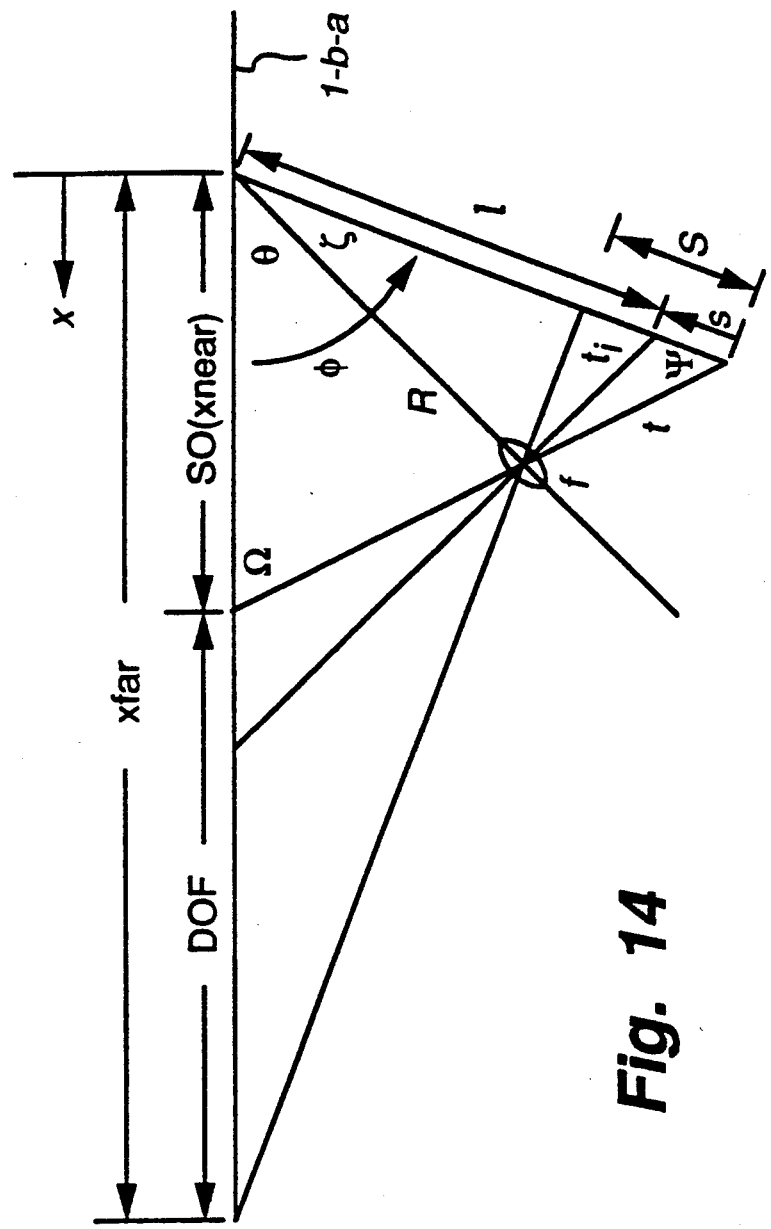
FIG. 14 illustrates the geometrical configuration of a ranging system.

Now referring more specifically to system geometry including the zoom lens, and with reference to FIG. 14, equations relating geometry to standoff (SO), depth of field (DOF) and resolution along the optical axis of the lens will be explained. The axis of interest is the laser beam axis, i.e., 1-b-a, and the equations for SO, DOF and resolution as a function of geometry are as follows. For any x, the following equations hold:

$$x = L \frac{\sin\psi}{\sin\Omega}, \text{ where} \tag{1}$$

$$L = L_1 - s \tag{2}$$

$$L_1 = 1 + \frac{S}{2} \tag{3}$$

$$1 = \sqrt{R^2 + t_i^2} \tag{4}$$

Also, $$y = \text{acos}\left[\frac{-R^2 + t^2 + L^2}{2tL}\right] \quad (5)$$

$$t = \sqrt{R^2 + L^2 - 2RL\cos\zeta} \quad (6)$$

$$\zeta = \text{atan}\left[\frac{-f\tan\theta}{f - R\tan\theta}\right] = \text{atan}\left[\frac{t_i}{R}\right] \quad (7)$$

and $$\Omega = \pi - \Psi - \phi \quad (8)$$

where $$\phi = \theta + \zeta. \quad (9)$$

A simple lens will not simultaneously allow for a DOF of 2' to 10', high resolution and yield acceptable lens-to-detector distance ($t_i$) and detector angle $\Psi$. That is, from the equations, a small standoff requires an unacceptably large $t_i$. A more sophisticated lens system considerably simplifies the mechanical requirements for optical element positioning.

Using the variable focus zoom lens overcomes this problem. Best resolution with a given zoom lens is obtained with minimum field angle (max zoom) and perpendicular optic axis and laser beam. This also gives the most even distribution of the resolution within the DOF. This arrangement may not practical in all applications, given that the targets may be at a substantial distance from the system, so some limiting lens orientation with a given field angle results.

Minimizing the triangulation base, when utilizing a zoom lens as discussed above, also provides higher resolution, because the field cone intersects the laser ray along a shorter line. A first problem, however, is focusing at short distances with a zoom system. One way of accomplishing this is to allow the detector position to vary along the lens optic axis, at the cost of complexity. Another problem is that the closer the lens is to the laser ray, the more uneven the distribution of resolution within a given DOF. This becomes markedly clear at large SO and DOF. These competing constraints should be "optimized" for each application.

Figure 15A:
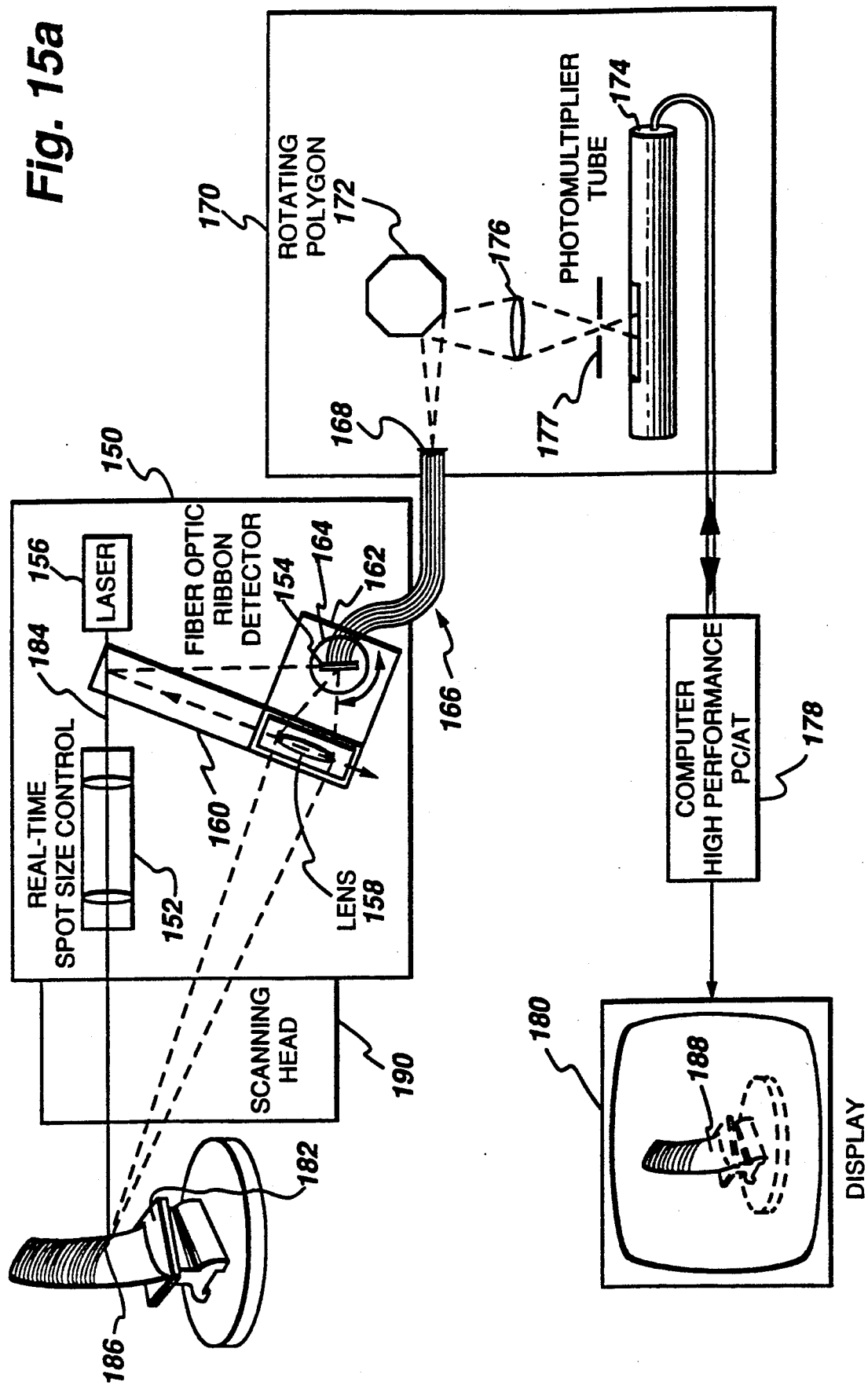
FIGS. 15a-c illustrate components of a variable depth range system camera including a real-time spot size control, an optical fiber ribbon detector and rotating polygon for scanning the optical fibers.

FIG. 15a illustrates a variable depth range system camera 150 including a realtime spot size control 152 and an optical fiber ribbon detector 154. Camera 150 also includes a laser 156 and a lens 158 mounted on X,Y stages 160 and 162, respectively. The lens, of course, could be fixed. Detector 154 is mounted on a rotation stage 164. Optical fiber detector 154 comprises an optical fiber bundle 166 which is disposed, at its output end 168 within a scanning unit 170. Scanning unit 170 includes a polygon mirror 172 which is mounted for rotation and aligned with optical fiber bundle output end 168 and a photomultiplier tube 174. A focusing lens 176 and a precision slit aperture 177 is disposed between polygon 172 and tube 174. Tube 174 is coupled to a computer 178 which, in turn, is coupled to a display 180.

In operation, and to image an object 182, laser 156 emits a beam 184. Beam 184 is intercepted by real-time spot size controller 152. Controller 152 focuses beam 184 onto object 182. An image of focus spot 186 is intercepted by lens 158 and focused onto detector 154. Light which is focused onto detector 154 is transmitted through optical fiber bundle 166 and emitted at output end 168. As polygon mirror 172 rotates, it scans across output end 168 of the optical fiber bundle and reflects light through focusing lens 176 and slit 177 into photomultiplier tube 174. The photomultiplier tube, in turn, generates a signal which is interpreted by computer 178.

Camera 150 may include a scanning head 190 which is utilized to control direction of beam 184 and reflection of focused spot 186. The scanning head may be the same as the scanning mechanism illustrated in FIGS. 13a and 13b.

Figure 15B:
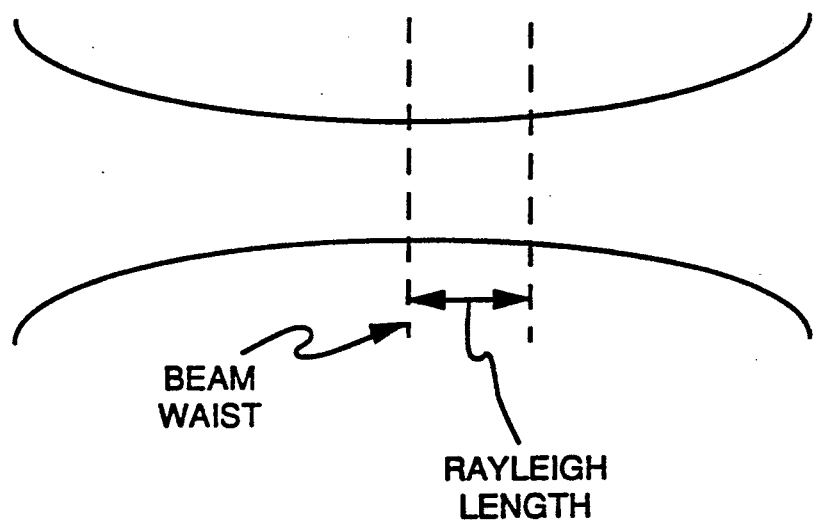

Real-time spot size controller may be a commercially available controller such as a General Scanning Linear Translater LT1320A available from General Scanning of Watertown, Mass. By maintaining a smallest size focus spot on object 186, the resolution and accuracy with which lens 158 and detector 154 can collect reflected light from the target is improved. The real-time controller is dynamic in that the focus spot size can be altered in real-time and during a scanning operation. More particularly, a laser used for range measurement operations typically has a finite beam diameter throughout its length, and the diameter constantly changes except at one location called the BEAM WAIST, as shown in FIG. 15b. The diameter of the beam is a minimum at the beam waist. In ranging applications, the portion of the beam which can be used is twice the Rayleigh length, where Rayleigh length is equal to $(\pi d_0^2)/4\lambda$, where $d_0$ is beam diameter at the waist and $\lambda$ is the light wavelength. Outside the Rayleigh length, the beam expands at a great rate, for small beam waist, and the result is a large spot on the target. Accurate measurement outside the Rayleigh length is difficult, if not impossible.

Figure 15C:
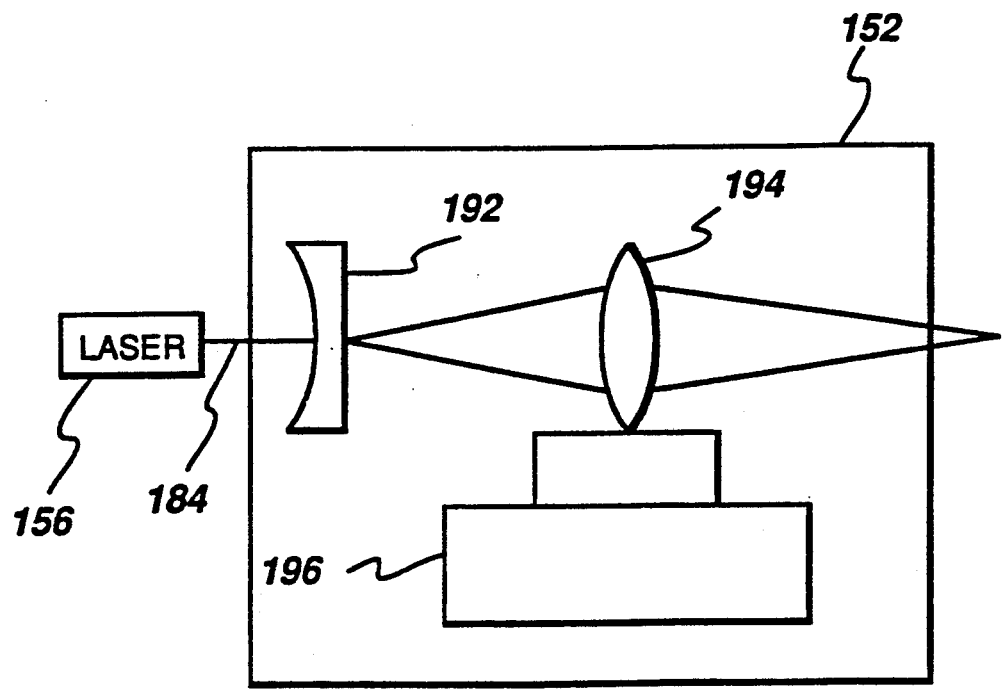
Figure 17:
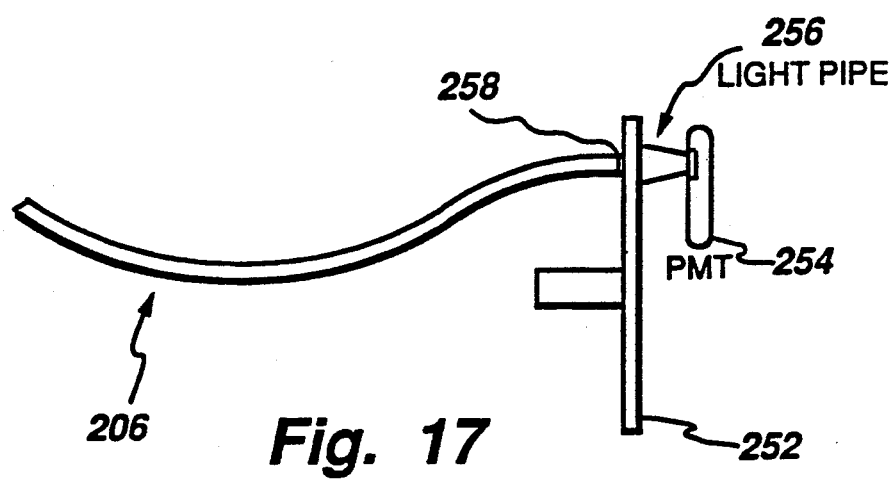
FIG. 17 illustrates operation of the encoder disk.

As shown in greater detail in FIG. 15c, a General Scanning LT1320A Linear Translator 152, which houses a fixed lens 192 and a lens 194 which translates on a galvanometer driven carriage 196, is used. This translator has a useable stroke of approximately 0.3 inches and provides spot sizes of less than 10 mils (0.010") over a range from approximately 2 feet to 11 feet. The spot size, or waist diameter, and its distance from the last optical element in the two-lens optical train of translater 152 are related to the lens focal lengths and their relative spacing, and by controlling the spacing, beam waist position along the beam axis can be controlled. A fixed negative 4 mm lens followed by a moving positive 81 mm lens, configured as shown in FIG. 15c, provides a range, approximately ten feet, of waist positioning with spot sizes less than approximately 10 mils over the allowable 0.3 inch lens motion.

There are two ways in which the configuration shown in FIG. 15c may be used. The first requires that the moveable lens be positioned at one end of motion, and moved while monitoring the shape of the focused return on the position-sensitive light detector. When the return has the tightest profile, i.e., when the width of the return is a minimum, the beam is at best focus. At this point, a range measurement is taken. This approach, while being quite reliable, may be somewhat slow due to the time it takes to slew the focusing lens until tightest focus.

The second approach, while being somewhat less reliable, is much faster. The translator module is calibrated to relate lens position to measured resultant beam waist location, and a lookup table is constructed. In use, the waist is positioned to the known midpoint of the range depth of field for the ranging system, and ranging is commenced. The most recent range value is used along with the lookup table to position the waist for the next range reading. The waist position will always be one rangel behind, but for most "well behaved" sculpted surfaces the surface will still be within twice the Rayleigh length, and a small spot size will result. The technique breaks down at jump discontinuities in the surface and for those regions on the surface where the range gradient is too large. This situation can be handled by monitoring some measure of the return signal shape, say the width at the "half max" point and tagging those readings for which the measure exceeds some threshold. By returning to the tagged locations and using the readings to position the translater, more readings can be taken. At this point, a tightly focused beam on the target surface should result, and subsequently good range readings are possible.

Referring again to FIG. 15a, optical fiber detector 154 facilitates high resolution and accuracy to improve sensitivity of the overall system. More particularly, detector 154 may include a relatively large number of detection elements, i.e., optical fibers. In order to maximize light sensitivity and dynamic range, a 1 inch wide, 1/16 inch thick coherent fiber optic ribbon comprised of 10 $\mu$m fibers is utilized. These fibers have a numerical aperture of 0.66, which means a full light acceptance cone of 82°. The other end of the fiber ribbon resides in an enclosure where it may be scanned for light pattern information as hereinafter described.

The optical fibers transmit the focused light to rotating polygon 172, which rotates in a controlled manner and in a timed sequence. As rotating polygon 172 rotates, it scans output end 168 of the optical fiber bundle. The rotation speed of rotating polygon 172 provides that a time-based, i.e. temporal, light signal is supplied to photomultiplier tube 174. Tube 174 may be a Hamamatsu side-on type PMT. More details with regard to the specific controls are provided hereinafter.

FIG. 16 illustrates another embodiment of a variable depth range camera 200. Camera 200 includes a realtime spot size controller 202, an optical fiber detector 204, an optical fiber bundle 206 and a zoom lens 208. Zoom lens 208 is mounted on a linear, pinned stage 210 that is rotatable about a pin 212. Zoom lens 208, of course, rather than being mounted on a linear stage, could be mounted on a rotational platter. Optical fiber detector 204 is mounted on a rotation stage 214.

Operation of camera 200 is substantially the same as operation of camera 150 illustrated in FIG. 15. Camera 200, however, includes a zoom lens 208 which was described hereinbefore with reference to FIGS. 12 and 13a-13b. The embodiment illustrated in FIG. 16 also includes a fiber scanning unit 250. Scanning unit 250 includes an encoder disk 252, a photomultiplier tube 254 and a light pipe 256. Output end 258 of optical fiber bundle 206 is disposed in alignment with encoding disk 252. A side view of encoder disk 252 is illustrated in FIG. 16. Encoding disk 252, as shown in FIG. 16, includes spiral scan slots 260A-C.

Briefly, as the disk rotates, the scanning slots alternately are aligned with output end 258 of optical fiber bundle 206, and any light being transmitted therethrough is allowed to pass through an aligned slot, through light pipe 256 and into photomultiplier tube 254. The scan spiral slots provide that the optical fiber output end 258 is scanned in a temporal based manner and at a constant speed. In this manner, a temporal-based light signal is provided to photomultiplier tube 254 and a computer 262 may be utilized to interpret the temporal based signals to generate a geometric or mathematical computer model and/or, on display 264, an image 266. More particularly, an image of the focused spot on an object, when associated with range calibration tables and knowledge of the orthogonal scan axis positions, leads to image 266. The specific control of the embodiment illustrated in FIG. 15 is described hereinafter.

Figure 18:
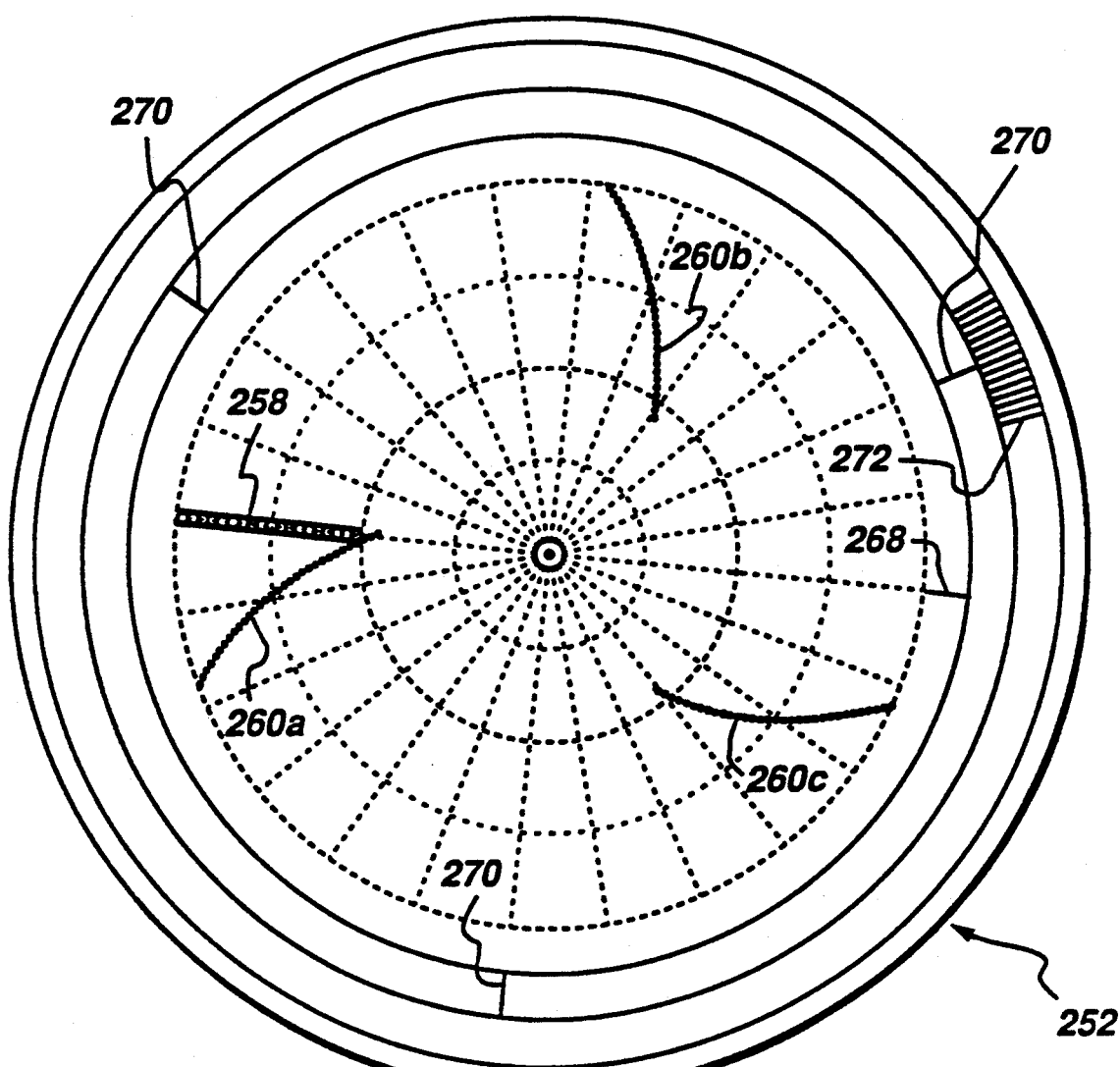
FIG. 18 illustrates an embodiment of an encoder disk.

FIG. 18 is a more detailed view of disk 252 including a "once per rev" track 268, a scan onset track 270, and a 3600 pulse per rev track 272. These tracks are discussed hereinafter in more detail. It should be apparent from FIG. 18, as disk 252 rotates, each slot 260a-c alternately is disposed so as to allow light to be emitted from output end 258 of optical fiber bundle 206 into photomultiplier tube 254. The scan spiral slots provide that the light signal provided to photomultiplier tube 254 is temporal based, i.e., light is transmitted by optical fiber output end 258 through encoder disk 252 and into light pipe 256 in a time-based manner.

Figure 19A:
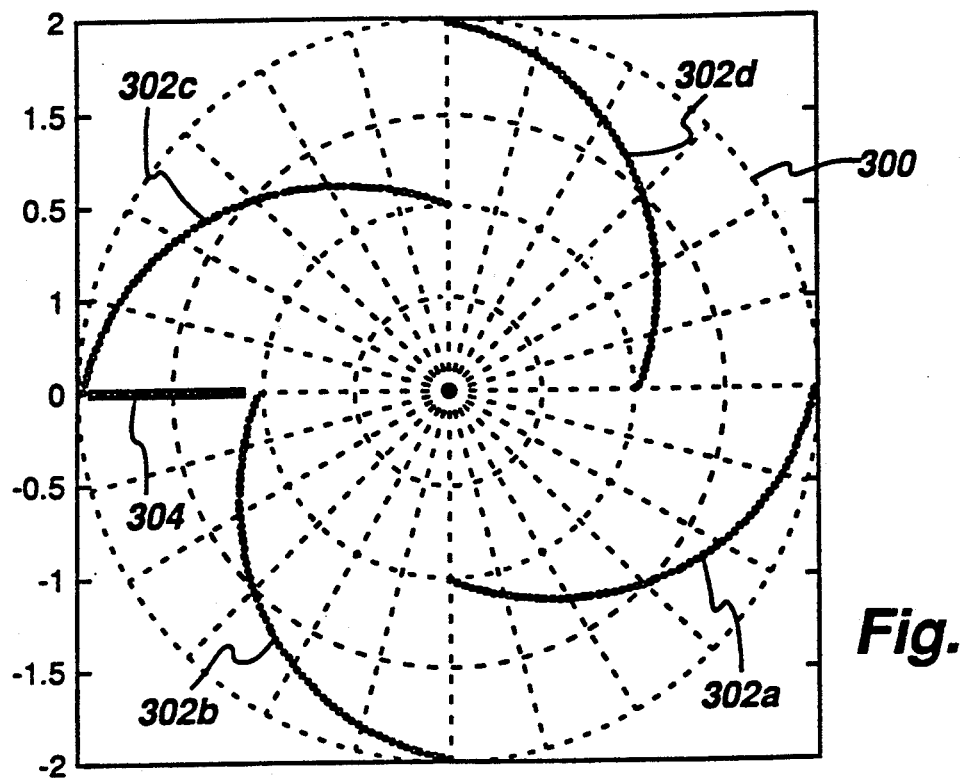
FIGS. 19a-19b illustrate further embodiments of an encoder disk.

FIG. 19a illustrates another embodiment of an encoder disk 300 which may be utilized. Encoder disk 300 includes four scan spiral slots 302a-d. An optical fiber output end 304 is shown to further illustrate a scan operation. As should be apparent from FIG. 19, many configurations of an encoder disk to perform a scan operation across an optical fiber output end bundle are contemplated and may be utilized.

In basic scanning, transparent scanning slits traverse, preferably at a constant velocity, across the bundle face. The slits should be disposed quite close to the fiber end (approximately 5 to 10 mils) and any light transmitted through a slit may, for example, be guided by a light pipe to a photomultiplier tube. The temporal output of the PMT is the electrical analog of the spatial light pattern on the fiber ribbon. The PMT signal is then digitized and used for range calculations.

Figure 19B:
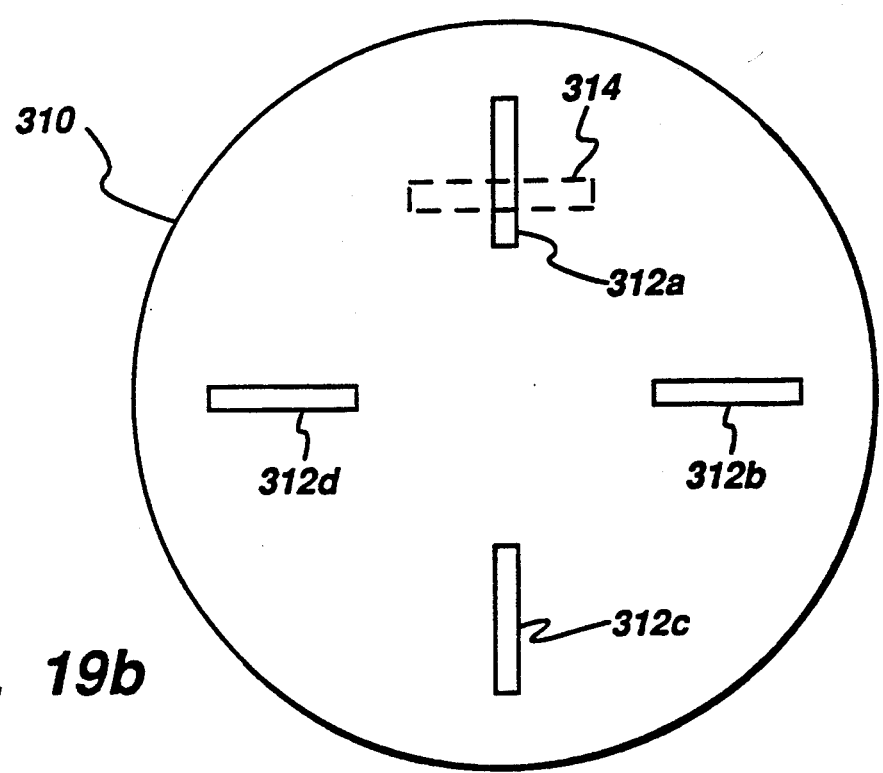

FIG. 19b is still another embodiment of an encoder disk 310 including radial slits 312a-d. An output end 314 of an optical fiber bundle is shown. If a radial slit is used with the encoder disk as shown in FIG. 19b, as the encoder disk rotates, the rate at which the slit would travel across the ribbon face is proportional to 1/(cos $\theta$)$^2$. That is, the image of the slit on the ribbon face moves more quickly near the edges of the ribbon than in the middle. $\theta$ should be kept as small as possible, which means using a large encoder disk. Even with a 6 inch diameter disk, however, the angle subtended by the slit vertical to the ribbon edge is almost 10°, and this in turn leads to a speed variation of more than 3%.

Preferably, the encoder disk provides that x=a$\theta$, where x is the distance along the ribbon face during a sweep, $\theta$ is the encoder orientation, and "a" is some constant related to the number of slit lines on the disk and the width of the fiber ribbon. Since $\dot{x}$=a$\dot{\theta}$, the scan speed is linearly related to the disk angular velocity, which is constant. Let r=a$\theta$, where r is the radial position of the slit at angle $\theta$.

If the disk shown in FIG. 18 is rotated counter clockwise, the sweep direction across the ribbon face is from left to right. Three slits are shown, although fewer or more can be used. With only two slits, the requirement of nominally 150 sweeps per second would require a disk angular velocity of 4500 rpm. With four, the speed is reduced to 2250 rpm. With ten, 900 rpm. The tradeoffs here are disk speed, calibration tables for each slit, and the angle at which the slit "cuts" the ribbon face. Spinning the disk at a reasonable speed, i.e., 2000 to 3000 rpm, provides good results. Each transparent slit will be slightly different from the others, probably enough to require its own calibration table, so minimizing the number of slits is advantageous. Finally, the larger the number of slits, the less orthogonal the relative orientations of the slits and the ribbon face. This can be addressed by slightly reorienting the ribbon and perturbing the slit design law.

Many other scanning systems could be utilized and are contemplated. For example, a cylinder with longitudinal slits could be used. A photomultiplier tube would be disposed in the cylinder facing the fiber bundle output end. The bundle output end face could be machined to have a curved geometry to match the cylindrical surface of the cylinder.

The light pipe shown is simply a truncated pyramid comprised of four pieces of front surface mirror glass that reflect light along the inside surface. Attention must be paid to the selection of the angles in the pipe in order to avoid the problem sometimes associated with this approach, specifically that it is sometimes possible for light to work its way down the pipe, only to turn around and travel back out. In this case, the pipe must be constucted to receive the light rays emerging from the fibers at maximum angle ($\pm 41°$).

In order for the camera to obtain dense range maps and/or range measurements at randomly selected locations, an optical scanning subsystem is provided. It is capable of providing range measurement arrays of up to $256 \times 256$ within a field of up to $90° \times 90°$. It is probably reasonable to restrict array elements to $n \times m$, where both n and m are powers of two. That is, array sizes can be $128 \times 64$, $32 \times 32$, $16 \times 128$, etc. The minimum field angle will be dictated by the array size and the field angle associated with the minimum scan step size.

The scanning function for both the beam and optical train is accomplished using coordinated motion of a scanning mirror and rotation of the "optical head", as shown in FIGS. 13a-b. The optical head is comprised of the laser, focus control (not shown) and optical assembly (motorized zoom lens and motorized fiber detector assembly). It will be "stood" on end and pivotable about the laser beam axis as shown in FIGS. 13a-b. The mirror is attached as shown, and its pivot axis intersects the laser beam as shown. The result defines a spherical coordinate system with the origin at the beam/mirror intersection. All range measurements are made with respect to this point.

One problem associated with a continuous raster scan is laser spot "smearing" associated with the spot velocity and the time requried for a full optical scan of the fiber ribbon. One way to approach this problem is to consider the following. The controlled laser probe beam spot size will be on the order of 10 mils on the target. Arbitrarily select the allowable distance the spot can travel during the fiber scan as a spot diameter, or 10 mils. One can pick any other number, but making it too small reduces allowable range sample rate, and too large results in a larger smearing effect. It seems reasonable to restrict the smear to an amount of the order of the smear associated with the spot itself. If how long the fiber scan takes is known, the maximum allowable spot velocity on the part can be calculated. The shorter the fiber scan time, the faster the allowable spot velocity. This reasoning is along the lines of using a strobe light to effectively freeze fast motion. The shorter the snapshot time, the faster the motion can be and still be effectively frozen.

For a given fixed A/D data rate of 750 khz, fixed by the hardware available, fewer samples lead to shorter fiber scan time $t_f$. The fiber ribbon is 1 inch wide and comprised of 10 micron fibers, so there are roughly 2500 fibers across the ribbon. Sampling 256 or 512 times along the ribbon face should be adequate coverage and should not miss important detail in the spatial pattern of light on the ribbon. The slits are very thin, e.g., 0.001". By making the transparent slits on the scanning disk too wide, resolution may be reduced. Oversampling the ribbon, say 4096 samples or more, yields little value because the fibers act as point sources and finer sampling than the inter-fiber distance yields no new information. Consequently, 1028 samples per fiber scan is preferred. This provides adequate coverage of the number of fibers (roughly every other one) while allowing a fine scanning slit wide enough to avoid a fiber drop-out problem.

At 750 khz, 1028 samples will take 1.37 msec. The allowable spot velocity on the part is then 10 mils/1.37 ms = 7.30 ips or 7.30 mils/ms. Now, $v = r\omega$ and r can be between 14 and 120 inches, i.e. 2 and 10 feet. These values, of course, can be changed. So the maximum allowable beam angular velocity is $\omega_b = v/r = 7.30/r$ rad/sec. The maximum allowable mirror angular velocity is therefore $\omega_m = \omega_b/2$. So $\omega_m \leq 7.30/2r$ rad/sec, or, $$\omega_m \leq 209.1/r°/\text{sec.}, \tag{10}$$

to prevent 10 mil spot smear. Note that even if this rate is allowed, and if obtaining 150 rangels/sec, the 1.37 msec taken for a fiber scan is 21% of the time between rangels, and the spot will have moved 21% of the way towards the new spot position by the time the fiber scan is complete. This still provides however, that there will be no more than a 10 mil "smear".

Figure 20:
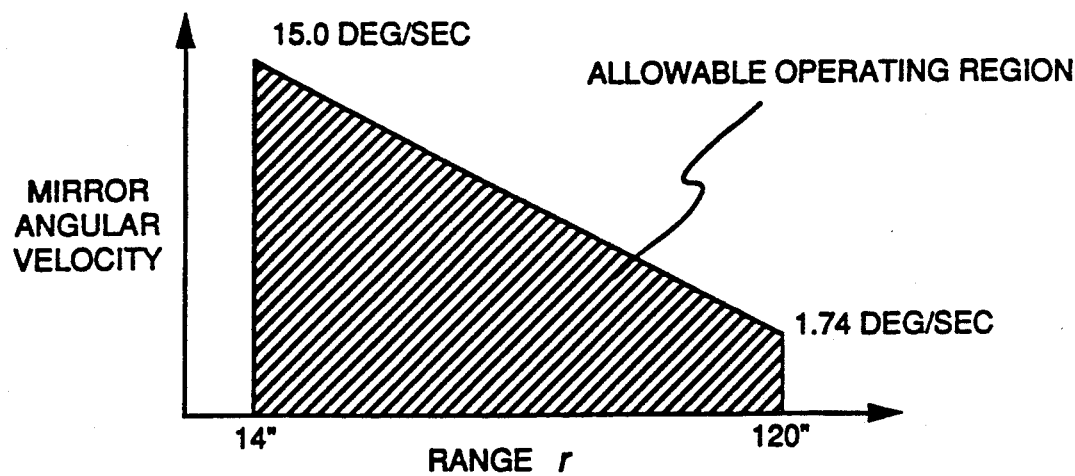
FIG. 20 illustrates an allowable operating region for mirror angular velocity.

If equation 10 is considered, the closer the target is to the mirror, and the narrower the field angle is (and, hence, the mirror excursion angle), the closer to the full 150 rangels/sec one can get unless the smearing specification is loosened. Looked at another way, there is a line in angular velocity/range space below which one can achieve the full rangel rate with acceptable smear as shown in FIG. 20. So long as the mirror angular velocity is les than $\omega_m$, there will be less than a 10 mil smear of the spot. Now, if the array size of the scan is mall, and the field angle relatively large, then the system will probably be mirror rate limited. That is, the mirror would have to move with an angular velocity outside the allowable zone. For a length n raster over a $\theta°$ field at some distance R, $$n/\text{rangelrate} = \# \text{ sec for the smooth scan, and} \tag{11}$$

$$\theta°/\# \text{ sec} = \text{required mirror rate } \omega_{mr} \tag{12}$$

This must be less than or equal to $\omega_m$ from equation (10). If it is not, the angular velocity is set to $\omega_m$ and the rangel rate must be adjusted to accommodate the maximum rate. Now, $$\omega_n/\theta° = \# \text{ sec for the raster scan, and} \tag{13}$$

$$n/\#\text{sec} = \text{calculated rangle rate } \dot{n}_c \tag{14}$$

But variable control over the scan disk velocity is not provided (for calibration simplicity), so one can only allow $$\dot{n} = 150/m, (m=1, 2, 3, \ldots) \text{ rangels/sec.} \quad (15)$$

That is, use each scan slit, every other one, every third one, etc. So choosing the maximum $\dot{n}$ such that $\dot{n} \leq \dot{n}_c$, if $\dot{n}_c$ is less than nominal (150 rangels/sec), then the next possible rangel rate is half nominal, next is one third, one fourth, etc. Using the value of $\dot{n}$ arrived at, $$n/\dot{n} = \# \text{ sec for the smooth raster scan.} \quad (16)$$

In some circumstances it will be faster to index the mirror at high speed to the next position, take a range reading, index again, and so on. This intuititively happens when large angular coverage (field angle) and few rangels within that coverage is preferred. There is be some maximum index frequency, determined by the settling time associated with the mirror dynamics. Call this $\Omega$ rangels/sec. Then $$n/\Omega = \# \text{ sec for the indexed raster scan} \quad (17)$$

This value should be compared with that determined by equation (16) and the smallest value used. If the equation (16) value is smaller, choose a smooth raster scan with rate n. If equation (17) yields the smaller value, choose an indexed raster scan with rate max $(n) \leq \Omega$. If the equation (16) value controls, a new required mirror scan rate $\omega_{mr}$ must be calculated.

$$\omega_{mr} = \frac{\theta^\circ}{2\frac{n}{\dot{n}}} \text{ °/sec.} \quad (18)$$

Note the factor of 2 in the denominator, which indicates the scan angle doubling due to a change in mirror angle.

Since the raster scanning function is so closely coupled to fiber scanning, choices made for mirror scanning strongly influence fiber scanning functionality and hardware. The following discussion relates to the fiber scan disk and describes the method used for synchronizing the raster mirror with the disk rotation. The basic range of mirror scan velocities for the smooth mirror scan mode is $1.74'''^\circ$ to $15.0^\circ$. If approximately 1 mm (39 mils) of spot position granularity at ten feet (120 inches) is needed, then $$0.039/120 = \Delta\theta = 0.000325 \text{rad} = 0.0186^\circ. \quad (19)$$

This yields 19,333 counts, i.e., positions of the beam, per beam revolution, or 38,666 effective counts per mirror rev, since the beam is defelected by twice the mirror deflection. For impedance matching purposes, a drive motor connects to the mirror through a 4:1 gear ratio, i.e., four motor revolutions will provide one mirror revolution, so 9666 counts per motor revolution are needed as shown in Equation (20).

$$19333 \frac{\text{counts}}{\text{beamrev}} \cdot 2 \frac{\text{beamrevs}}{\text{mirrorrec}} \cdot \frac{1 \text{mirrorrev}}{4 \text{motorrec}} = 9666 \frac{\text{counts}}{\text{motorrev}} \quad (20)$$

So 9666 steps per motor rev provides adequate mirror positioning granularity, i.e., with approximate spot position control of 1 mm at ten feet. This is well within reason, and in fact can easily be increased to 20,000 steps per rev, which yields better than ½ mm spot control at ten feet. Assume then 20,000 steps per motor rev.

$$20000 \frac{\text{counts}}{\text{motorrev}} = >80000 \frac{\text{counts}}{\text{mirrorrec}} = >40000 \frac{\text{counts}}{\text{beamrev}} \quad (21)$$

So, for the 15°/sec mirro angular velocity case, $$15^\circ/\text{sec} \cdot \frac{80000 \text{ counts}}{360^\circ} = 3333.33 \text{ counts/sec.}$$

For the 1.74°/sec case, $$1.74 \cdot \frac{80000}{360} = 386.7 \text{ counts/sec.}$$

The mirror motor will need to be stepped at rates between 350 and 3500 steps per seconnd. Running the mirror using an intelligent controller than can coordinate two axes by using the encoder from one to control the other is preferred. The ribbon scan disk has three spiral-shaped slits and rotate at $150/3 = 50 - \text{revs/sec} = 3000$ rpm. Placing an incremental encoder track on the disk, its output can be used to input to the motor controller. The controller has a mode where it runs using an "encoder ratio" that is essentially a divide by n counter. For every n counts of the selected encoder, it will output 1 count to a selected motor. The mirror motor rate is controlled by selecting various values of n as the encoder ratio. The encoder reading section of the motor controller board can track encoder pulses at a rate up to 500 khz. Lower rates can be provided. It is preferred, however, to use fast pulse rates. If a 200 khz pulse rate is selected, working with 150 rangels/sec, $200,000/150 = 1333.33$ disk counts per rangel results. There must be an integer number of counts per rangel, so 210 khz is used which leads to 1400 disk counts per rangel. This in turn leads to 4200 counts per revolution of the scan disk. This should be satisfactory, especially for a six inch diameter disk, because appreciably more counts per rev would be more difficult to manufacture, hence more costly. The reason higher encoder pulse counts per disk rev is required can be see as follows. To have relatively fine control over the raster mirror scan rate, the scan rate in °/sec is calculated by:

$$\omega = \frac{210,000}{n} \cdot \frac{360}{8000} = \frac{945}{n} \text{ °/sec} \quad (22)$$

Fine control over $\omega$ is achieved when a small change in $\omega$ results from a unit change in n. But $$\frac{d\omega}{dn} = -\frac{945}{n^2} \quad (23)$$

so fine control is inversely related to $n^2$. For a given desired $\omega$, solve for n using equation (23). The numerator of equation (23) is directly related to the number of disk encoder pulses and, because of the constant disk speed, the encoder pulse rate. It follows that a faster encoder pulse rate requires larger n for a desired $\omega$, hence finer control over $\omega$. For ease in triggering the A/D, a track on the disk that provides a pulse when each of three spiral slits begins a scan of the fiber may be provided. These pulses could begin simultaneously with the scans or precede the spirals by some amounts so that the best number of encoder pulses to wait before triggering the A/D can be determined. The first approach triggers the A/D board directly if enabled. The second requires some counting/triggering hardware, but is programmable/calibratable. If variable positioning of the optical encoder read head is provided, one can obtain mechanical "programming".

The scanning mirror provides a vertical raster sweep in the workspace. This is in a single direction for simplicity. The motion of the mirror is 1) a controlled sweep downward and 2) a fast retrace upward. The downward motion must start at an appropriate time so that it is syncronized with the fiber scan disk, taking into consideration the time associated with accelerating the mirror to speed. That is, the mirror must come up to speed and be at the first measurement position when one of the scan slits is just starting a fiber scan. Aerotech's translator controller for the mirror motor drive may be used. The largest ramp time required to come up to speed for the worst case can be determined for each application. This is equivalent to some number of scan disk rotations. The number of disk pulses represented by this number of disk rotations is in turn equivalent to some number of mirror motor pulses via encoder ratio n. Call this number $n_b$. At this point, position the scan mirro $n_b$ pulses before the mirror position to obtain the first rangel. Then, at the once-per-rev pulse of the disk, enable encoder tracking on the motor controller. The mirror will accelerate to speed while the scan disk spins, and the mirror and disk will be in lockstep for the "good measure" disk rotations and the onset of range sampling. At the end of the scan, the mirror motion is halted, encoder following is terminated, and the mirror is commanded back to the prescan position at high speed.

Figure 21:
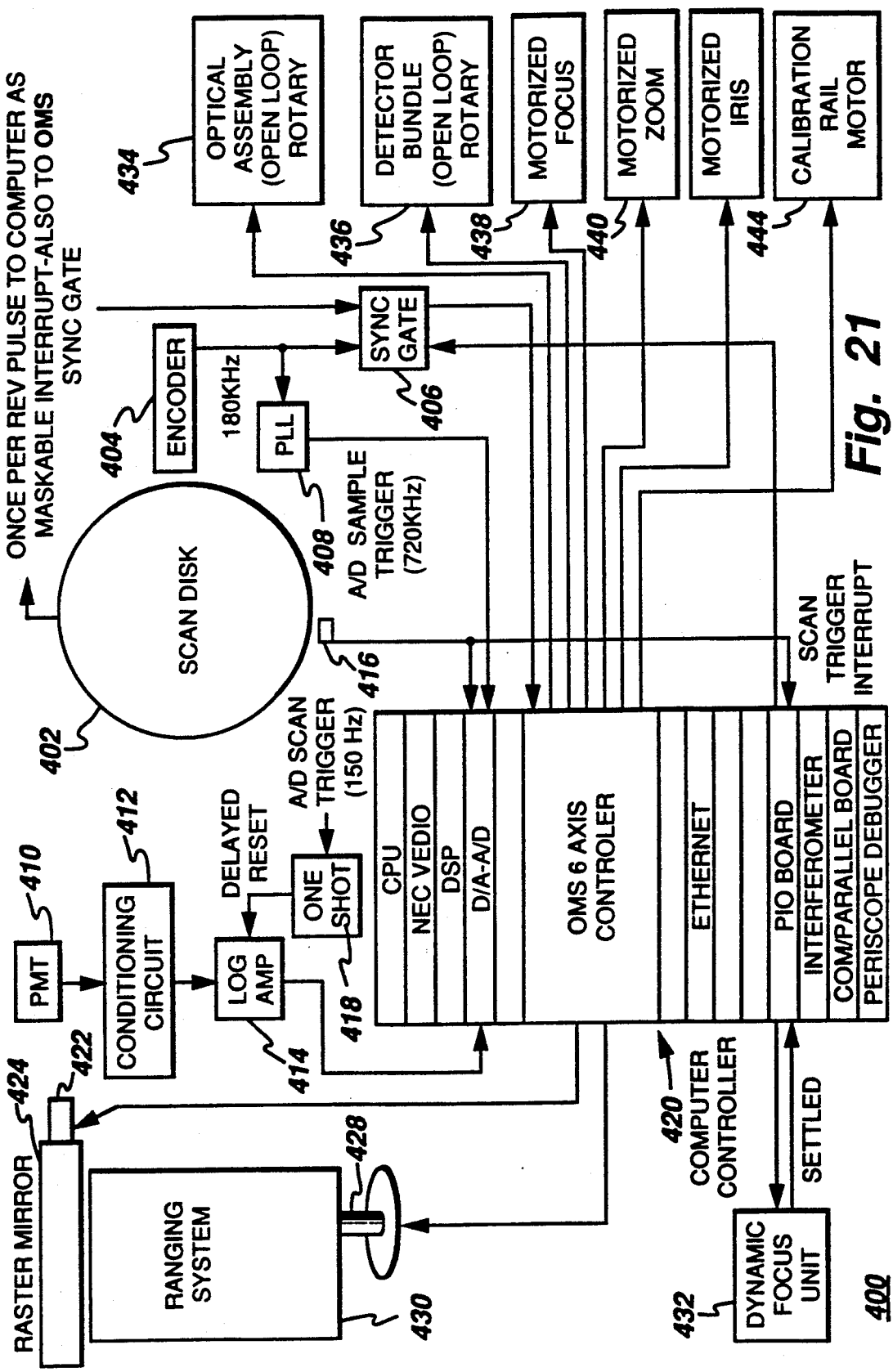
FIG. 21 is a block diagram depiction of controls for the camera system shown in FIG. 15.

Referring now to FIG. 21, a block diagram 400 of a variable depth triangulation ranging system is shown. The ranging system includes a scan disk 402 which, in operation, is utilized to encode signals from an output end of an optical fiber bundle as hereinbefore described. An encoder 404 is shown disposed so as to be able to receive signals from encoding tracks on disk 402. Encoder 404 is coupled to a synchronizing gate 406 and a phse-locked loop (PLL) 408. A photomultiplier tube (PMT) 410 is shown as being coupled to a conditioning circuit 412 which, in turnh is coupled to a logarithmic amplifier 414. An analog-to-digital scanning trigger signal operating at 150 hz is obtained from another encoding track on disk 402. The disk scanning signal is also utilized, utilizing a one shot mechanism 418 to reset amplifier 414. Signals from logarithmic amplifier 414 and the PLL 408, which provides a signal of 720 khz, is supplied to a computer controller 420. Computer controller is coupled to a step motor 422 to control the rotation of raster scan mirror 424. A counter may be coupled between computer controller and step motor 422 in order to count the pulses sent to step motor 422. Computer controller 420 is also coupled to a step motor 428 which is utilized to control the horizontal scan rotation of a ranging system 430. System 430 may be identical to the ranging system 150 illustrated in FIG. 14. Computer controller 420 also is shown as being coupled to a dynamic focus unit 432 which may be identical to real-time spot size control 152 illustrated in FIG. 14. Computer controller 420 also is coupled to an optical assembly rotary 434, a detector bundle rotary 436, a motorized focus 438 and a motorized zoom 440 for controlling the zoom lens and a calibration rail motor 444.

More particularly, and with reference to the block diagram of the system shown in FIG. 21, the ranging system is comprised of four basic sections—a mechanical subsystem, an optical subsystem, a calibration system, and a computing system. With regard to the mechanical subsystem, there are six mechanical degrees of freedom. Two degrees of freedom provide for laser beam scanning—one for motion of the raster scanning mirror and one to rotate the entire optical assembly. Two degree of freedom are provided for zoom and focus control of the motorized lens. Other degrees of freedom provide for manipulation of the lens assemblies themselves. Particularly, one degree of freedom provides rotary motion of the entire lens/fiber bundle assembly and the other degrees of freedom provides rotary motion of the entire lens/fiber bundle assembly and the other degrees of freedom rotates the detection end of the fiber bundle itself. All motors are microstepping motors and are controlled by a six axis stepper motor controller residing on a PC bus. The controller sends out step pulses to each motor translator module which provides a proportional current to each of the motor windings. The controller also reads encoder signals for closing a control loop on the motor on which the encoder is placed or for controlling one motor based upon a state of another motor.

The calibration system includes a precision rail of approximately ten feet on which rides a target carriage and corner cube retroreflector for an interferometer system. It is also stepper motor driven, and is driven by the controller channel usually serving the horizontal scanning motor since the scanning function is disabled during calibration. The calibration rail motor and the horizontal scanning motor are of similar size and power. More detail with regard to calibration is provided hereinafter.

Without regard to the optical subassembly, the probe laser beam is directed into a dynamic focus assembly, as hereinbefore described, which basically is a computer controlled telescope. The computer controller can accept either an analog signal from a D/A converter or digital signals from a programmable I/O (PIO) board, and the controller positions one lens of the telescope with respect to the other lens. The beam exits the The beam strikes the target, and some of the reflected light energy is captured by the motorized zoom/focus lens and focused onto the end of the coherent optical fiber bundle, again after having reflected off the raster mirror. The light emerges from the output end of the bundle and is scanned by the scan disk, at which point the light allowed through the disk travels down the light pipe and into the photomultiplier tube (PMT). The signal from the PMT passes into a current-to-voltage amplifier and on to the logarithmic amplifier. From there the signal is passed to the A/D where it is digitized and sent over a high speed bus to a digital signal processor (DSP) card. The result of processing is a range value which is passed to the computer controller and stored.

The computer controller is a 25 MHz 80386-based industrial IBM PC/AT. It is used to orchestrate the behavior of the system and store, manipulate and display range data. The computer controller is a fourteen slot computer and all the required cards fit in the computer controller. Ten boards—CPU, NEC Video, DSP, D/A—A/D, OMS 6 axis Controller, Ethernet, PIO Board, Interferometer, Com/Parallel Board, and Periscope Debugger—reside on the bus.

As hereinbefore described, the scan disk preferably has three clear thin spiral slits on an opaque background for scanning the fiber bundle face. There are also three encoder tracks placed toward the outer circumference of the fiber bundle face. The outer-most track is a 3600 pulse encoder track which provides a 180 khz pulse train to the phase locked loop (PLL) and synchronization gate as the disk spins at 50 revolutions per second (3000 rpm). The PLL multiplies this frequency by four to present a 720 khz signal to the A/D sample trigger. This is done to synchronize the A/D with the position of the scanning disk.

The middle encoder track provides three pulses per revolution for the onset of a scan for each of the three spiral slits on the disk. This signal triggers the A/D to take a number of readings when it has been configured by the CPU to do so. This signal also interrupts the CPU via the PIO board to inform the controlling program of a new scan sweep, or at least the passage of another spiral if the spiral slits are being skipped for slower rangel rate, so that the controlling program can count to determine which spiral the data is coming from. The scan trigger signal is also used to trigger the monostable one shot which resets the log amp output between scans.

The inner track provides one pulse-per-rev (OPR pulse) in order to establish the "home" position of the scan disk. This is necessary because the disk is spun in an open loop fashion with respect to the rest of the system and the system has no other way of establishing the true position of the disk. The signal interrupts the CPU via the PIO board and is also directed to the sync gate.

Figure 22:
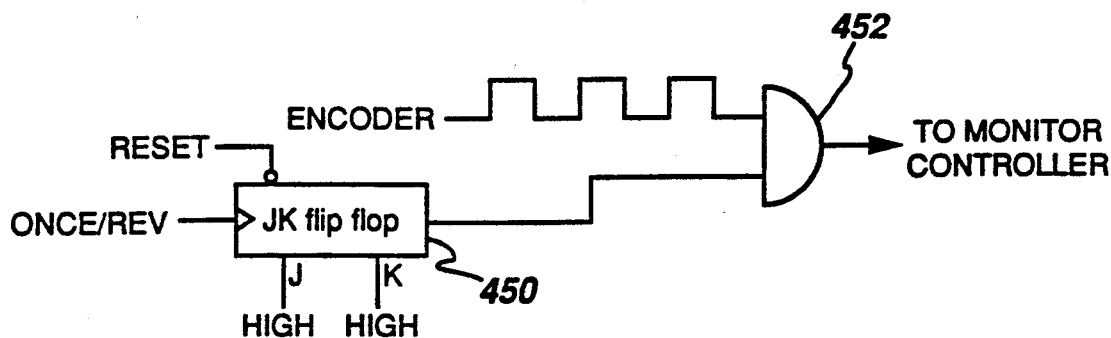
FIG. 22 is a block diagram of the Sync Gate shown in FIG. 21.

The sync gate synchronizes the raster mirror with the disk, since the outer encoder track pulses are used to drive the mirror via a user selectable encoder ratio in the motor controller. The mirror must be controlled precisely and in concert with the scan disk if range measurements are to be accurately associated with specific locations on the target surface, and the sync gate is what is used to established the synchronization. The sync gate is shown in FIG. 22 in block diagram. Particularly, the sync gate includes a J-K flip flop and an AND gate 452. Thbe once per rev pulse is input to the flip-flop, and output from the flip flop is "anded" with the encoder signal. The output signal from the AND gate is fed to the motor controller, i.e., the OMS 6 Axis Controller.

As long as the reset line of the flip flop is held low by the PIO board, the flip flop output is low and the AND gate does not pass the encoder signal to the motor controller. When the system is ready to start a raster scan, it waits for a once-per-rev pulse, enables the motor controller to encoder tracking mode and directs the PIO to set the rest line high and waits for the next OPR pulse. When the next OPR pulse occurs, it clocks the flip flop, which sets the output to high, enabling the AND gate to pass encoder signals, at which point the scan mirror begins rotation. It also signals to the CPU that the A/D be enabled so when the scan onset pulses from the middle track occur, the A/D takes the predetermined number, e.g., 2048, of conversions at the 720 khz rate set by the PLL. The CPU monitors the scan onset pulses to determine when, or if, to continue to enable the A/D. There is time between the OPR pulse and the first scan onset pulse for A/D set up.

The calibration rail carries a calibration target and a retroreflector for the interferometer system which is used to provide precise independent measurements of target position. Since the rail can only make relatively smooth motions, the interferometer will be able to track the target unless the rail speed is too great. Rail speed, therefore, should be limited during calibration.

Two different calibrations are performed. The first is a calibration of the dynamic focus assembly to build a look-up table of telescope lens position versus measured range value. The calibrations rail is homed, the interferometer is set to zero, and the focus is varied until the spot on the target is smallest. This will be determined by analyzing the shape of the lop amp output in time—the "peakiest" shape implies the smallest spot. For each target position, the drive signal required for tightest focus is stored in the dynamic focus look-up table. This task may be performed manualy or by machine, depending on the relative amount of time required for the manual operation versus that required for code development for automatic operation. Parallel digital signals are sent to the dynamic focus assembly for positioning, and the assembly sends back a digital "position settled" signal that the computer polls to determine when the dynamic focusing is complete.

The second calibration task is to build look-up tables for each of the "configurations" of the systems. A configuration is basically a state vector, the components of which are the positions of the four optical components-zoom, focus, optical assembly, and fiber bundle end orientation—which set the stand-off distance, depth of field, and range resolution of the system. To establish any configuration, the general operation will be to send all four axes home, reset internal and motor controller position counters, and position the four axes to the appropriate positions. The calibration rail is homed, then moved until a non-zero return is registered by the system. The inaccurate range value obtained by this measurement is used to set dynamic focus, and another, generally more accurate value is obtained. The position of the centroid of the return signal on the fiber bundle as read by the three scan spiral slits is entered into the appropriate one three look-up tables and associated with the range values read from the interferometer.

While the invention has been particularly shown and described with reference to preferred embodiments thereof, it will be understood by those skilled in the art that the foregoing and other changes in form and details may be made without the parting from the spirit and scope of the invention as defined in the appended claims.

What is claimed is:

1. An apparatus for a variable depth triangulation ranging system, the ranging system including means for emitting a light beam, means for focusing an emitted light beam on an object, and light sensitive means; said apparatus comprising:

zoom lens means for imaging reflected light onto said light sensitive means, a distance between said zoom lens means and said light sensitive means being substantially fixed when in an operative condition, said light sensitive means being rotatable relative to said zoom lens means; and means for adjustably positioning said light sensitive means and said zoom lens means such that an emitted light beam, a plane axis through said zoom lens means, and an image line through said light sensitive means all intersect at approximately a common point and satisfying the Scheimpflug condition.

2. An apparatus in accordance with claim 1 wherein said zoom lens means is adjustable for varying a field angle and focus.

3. An apparatus in accordance with claim 1 wherein said light sensitive means is mounted on a rotation stage and said zoom lens means and said rotation stage having said light sensitive means mounted thereon are mounted on a rotational platter.

4. An apparatus in accordance with claim 1 wherein said zoom lens means is driven by a stepper motor.

5. An apparatus in accordance with claim 1 wherein said zoom lens means comprises a zoom, a focus and an iris lens.

6. An apparatus in accordance with claim 1 wherein the Scheimpflug condition is adjustably satisfied.

7. An apparatus in accordance with claim 1 wherein said means for adjustably positioning said light sensitive means and said zoom lens means comprises:
a rotation stage having said light sensitive means mounted thereon;
a rotational platter having said rotation stage and said zoom lens means mounted thereon; and
a first and a second computer-controlled stepper motor, said first stepper motor coupled to said rotation stage and said second stepper motor coupled to said rotational platter.

8. A zoom lens apparatus for a variable depth triangulation ranging system, said zoom lens apparatus comprising:
a rotation stage having a light sensitive means mounted thereon;
a rotational platter having said rotation stage and a zoom lens means mounted thereon, a distance between said zoom lens means and said light sensitive means being substantially fixed; and
whereby said light sensitive means and said zoom lens means can be adjustably positioned to satisfy the Scheimpflug condition.

9. An apparatus in accordance with claim 8 wherein said rotation stage is driven by a first computer-controlled stepper motor and said rotational platter is driven by a second computer-controlled stepper motor.

10. An apparatus in accordance with claim 9 wherein said zoom lens means is driven by a third stepper motor.

11. An apparatus in accordance with claim 8 wherein said zoom lens means is adjustable for varying field angle and focus.

12. An apparatus in accordance with claim 8 wherein said zoom lens means comprises a zoom, a focus, and an iris lens.

13. An apparatus for a ranging system comprising:
a zoom unit including zoom, focus and iris lenses;
a first stepper motor for controlling a relative position of said zoom, focus and iris lenses of said zoom unit;
a light sensitive means;
a rotation stage having said light sensitive means mounted thereon; and
a rotational platter having said zoom unit and said rotation stage mounted thereon.

14. An apparatus in accordance with claim 13 wherein said rotation stage and said rotational platter, respectively, are driven by second and third stepper motors, respectively.

15. An apparatus in accordance with claim 13 wherein said zoom unit and said light sensitive means are adjustable to satisfy the Scheimpflug condition.

* * * * *